(12) United States Patent
Luckay et al.

(10) Patent No.: US 12,434,836 B2
(45) Date of Patent: Oct. 7, 2025

(54) DELIVERY DROP POINTS FOR AUTONOMOUS DELIVERY VEHICLES

(71) Applicant: United States Postal Service, Washington, DC (US)

(72) Inventors: Ryan M. Luckay, Vienna, VA (US); Robert E. Dixon, Jr., Haymarket, VA (US); Gregory Cooil, Arlington, VA (US)

(73) Assignee: United States Postal Service, Washington, DC (US)

( * ) Notice: Subject to any disclaimer, the term of this patent is extended or adjusted under 35 U.S.C. 154(b) by 223 days.

(21) Appl. No.: 17/930,849

(22) Filed: Sep. 9, 2022

(65) Prior Publication Data

US 2023/0109266 A1      Apr. 6, 2023

Related U.S. Application Data

(62) Division of application No. 15/861,191, filed on Jan. 3, 2018, now Pat. No. 11,453,497.

(Continued)

(51) Int. Cl.
*B64F 1/32* (2006.01)
*B64D 1/12* (2006.01)
(Continued)

(52) U.S. Cl.
CPC ............... *B64D 1/12* (2013.01); *B64F 1/32* (2013.01); *B65G 1/00* (2013.01); *G05D 1/0094* (2013.01);
(Continued)

(58) Field of Classification Search
CPC ............................ B64U 2101/64; B64F 1/32
See application file for complete search history.

(56) References Cited

U.S. PATENT DOCUMENTS 9,211,025 B1     12/2015   Elhawwashy
9,487,356 B1 *   11/2016   Aggarwal ............. B65G 1/137
(Continued)

FOREIGN PATENT DOCUMENTS

ES     1135980 U      2/2015
GB     2558601 A      7/2018
(Continued)

OTHER PUBLICATIONS

Bommer Industries Apartment Mailbox, May 27, 2014, "https://commons.wikimedia.org/wiki/File:Bommer_Industries_Apartment_Building_Mailbox.JPG" (Year: 2014).*

(Continued)

*Primary Examiner* — William L Gmoser
(74) *Attorney, Agent, or Firm* — Knobbe, Martens, Olson & Bear, LLP

(57) ABSTRACT

Autonomous delivery drop points for delivery of an item are provided. The autonomous delivery drop points can include a proxy sensor to communicate information related to the autonomous delivery drop point to an autonomous delivery vehicle. The autonomous delivery drop points can include a delivery inlet configured to accept the item. The autonomous delivery drop points can include a storage receptacle configured to store the item until the item is retrieved by the owner of the item. The autonomous delivery drop points can include an attachment member coupled to the item. The autonomous delivery drop points can include a hook configured to couple to the attachment member to accept the item, wherein the hook comprises the proxy sensor.

10 Claims, 21 Drawing Sheets

Related U.S. Application Data

(60) Provisional application No. 62/441,878, filed on Jan. 3, 2017.

(51) Int. Cl.

| | | |
|---|---|---|
| *B64U 70/95* | (2023.01) | |
| *B64U 101/64* | (2023.01) | |
| *B65G 1/00* | (2006.01) | |
| *G05D 1/00* | (2024.01) | |
| *G06Q 10/0836* | (2023.01) | |
| *B64D 1/02* | (2006.01) | |
| *B64U 10/13* | (2023.01) | |
| *B64U 80/25* | (2023.01) | |
| *B64U 101/69* | (2023.01) | |

(52) U.S. Cl.
CPC ........... *G06Q 10/0836* (2013.01); *B64D 1/02* (2013.01); *B64U 10/13* (2023.01); *B64U 70/95* (2023.01); *B64U 80/25* (2023.01); *B64U 2101/64* (2023.01); *B64U 2101/69* (2023.01); *B64U 2201/10* (2023.01); *B65G 2209/04* (2013.01)

(56) References Cited

U.S. PATENT DOCUMENTS

| | | | |
|---|---|---|---|
| 9,536,216 B1 * | 1/2017 | Lisso | B65B 43/00 |
| 10,220,964 B1 * | 3/2019 | Sperindeo | G06T 7/20 |
| 10,501,205 B1 * | 12/2019 | Siewert | B64D 1/22 |
| 10,703,507 B2 | 7/2020 | Comerford | |
| 10,769,929 B2 | 9/2020 | Qiu | |
| 2015/0158599 A1 | 6/2015 | Sisko | |
| 2015/0175276 A1 | 6/2015 | Koster | |
| 2015/0183528 A1 | 7/2015 | Walsh et al. | |
| 2016/0117934 A1 | 4/2016 | Soundararajan et al. | |
| 2016/0159496 A1 | 6/2016 | O'Toole | |
| 2016/0189098 A1 | 6/2016 | Beaurepaire et al. | |
| 2016/0364989 A1 | 12/2016 | Speasl et al. | |
| 2017/0023949 A1 | 1/2017 | Fisher et al. | |
| 2017/0073085 A1 | 3/2017 | Tremblay et al. | |
| 2017/0091710 A1 | 3/2017 | Van Dyke | |
| 2017/0225802 A1 * | 8/2017 | Lussier | B64U 10/14 |
| 2017/0228692 A1 | 8/2017 | Pargoe | |
| 2017/0305575 A1 | 10/2017 | Bash et al. | |
| 2018/0075688 A1 | 3/2018 | Liu | |
| 2018/0121872 A1 | 5/2018 | Walsh | |
| 2018/0174093 A1 | 6/2018 | Perez | |
| 2018/0186473 A1 * | 7/2018 | Erickson | B60L 53/665 |
| 2018/0290763 A1 * | 10/2018 | Huang | G08G 5/56 |
| 2019/0283536 A1 | 9/2019 | Suzuki et al. | |
| 2019/0311327 A1 | 10/2019 | Habbaba et al. | |

FOREIGN PATENT DOCUMENTS

| | | |
|---|---|---|
| WO | WO 2015/095948 A1 | 7/2015 |
| WO | WO 2017/041145 A1 | 3/2017 |

OTHER PUBLICATIONS

Faugere, Louis, and Benoit Montreuil. "Hyperconnected pickup & delivery locker networks." Proceedings of the 4th International Physical Internet Conference. vol. 6. 2017. (Year: 2017).

* cited by examiner

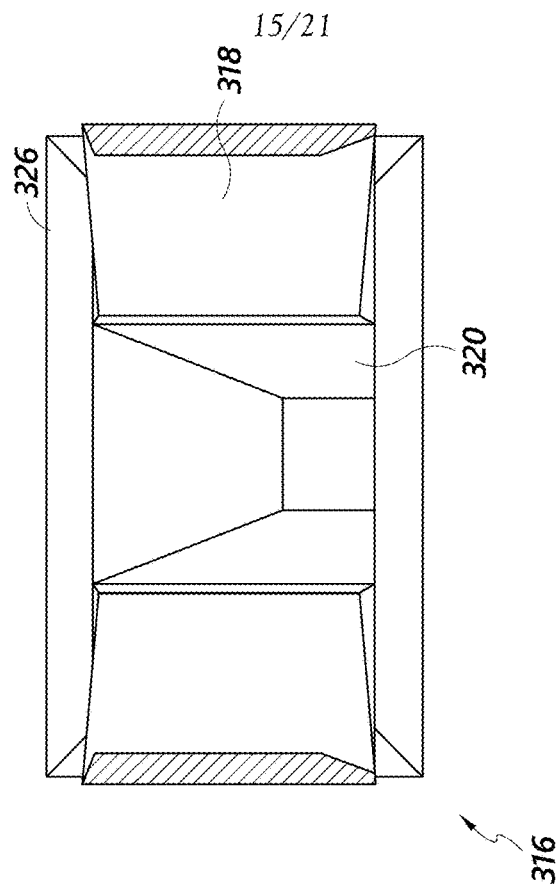
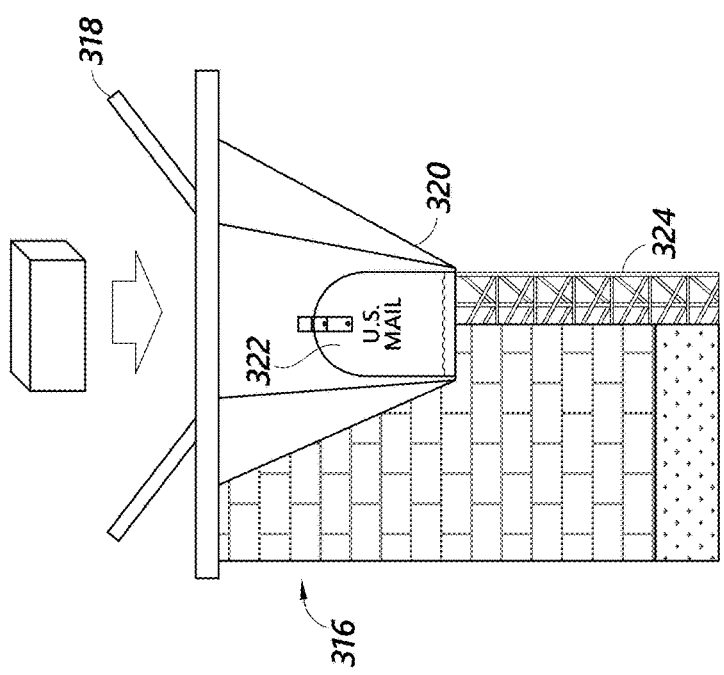
FIG. 14B
FIG. 14A

DELIVERY DROP POINTS FOR AUTONOMOUS DELIVERY VEHICLES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a divisional application of U.S. application Ser. No. 15/861,191, filed Jan. 3, 2018, which, in turn, claims the benefit of U.S. Provisional Application No. 62/441,878 filed on Jan. 3, 2017, the entire contents all of which are hereby incorporated by reference.

BACKGROUND

This disclosure relates to the field of item delivery using autonomous delivery drop points for autonomous delivery vehicles.

SUMMARY OF THE INVENTION

In one aspect described herein, an autonomous delivery drop point for delivery of an item is provided. The autonomous delivery drop points can include a proxy sensor to communicate information related to the autonomous delivery drop point to an autonomous delivery vehicle. The autonomous delivery drop points can include a delivery inlet configured to accept the item. The autonomous delivery drop points can include a storage receptacle configured to store the item until the item is retrieved by the owner of the item.

In some embodiments, an autonomous delivery drop point for delivery of an item is provided. The autonomous delivery drop point can include a proxy sensor to communicate information related to the autonomous delivery drop point to an autonomous delivery vehicle. The autonomous delivery drop point can include an attachment member coupled to the item. The autonomous delivery drop point can include a hook configured to couple to the attachment member to accept the item, wherein the hook comprises the proxy sensor.

In one aspect described herein, an autonomous delivery receptacle comprises a proxy sensor configured to communicate information related to the autonomous delivery drop point to an autonomous delivery vehicle; a delivery inlet configured to accept the item; and a storage receptacle configured to store the item; and an access port to allow access to the item within the storage receptacle.

In some embodiments, the storage receptacle comprises a helical slide.

In some embodiments, the storage receptacle is configured to retrofit a mailbox.

In some embodiments, the autonomous delivery drop point comprises multiple storage receptacle configured to rotate.

In some embodiments, the autonomous delivery drop point is configured to rotate the storage receptacle toward the delivery inlet.

In some embodiments, the delivery inlet is a door.

In some embodiments, the delivery inlet is an aerial port.

In some embodiments, the autonomous delivery receptacle further comprises one or more arms configured to accept the item.

In some embodiments, the autonomous delivery receptacle is configured to close based on the weight of the item.

In some embodiments, the delivery receptacle comprising a sensor configured to detect the presence of an item.

In some embodiments, the delivery receptacle further comprises a charging station for the autonomous delivery vehicle.

In some embodiments, the deliver receptacle comprises an item lowering system configured to lower the item from a first height to a second height.

In some embodiments, the item is delivered via an autonomous delivery vehicle.

In another aspect, an autonomous delivery drop point comprises a proxy sensor configured to communicate information related to the autonomous delivery drop point to an autonomous delivery vehicle; an attachment member coupled to the item; and a hook configured to couple to the attachment member to accept the item, wherein the hook comprises the proxy sensor.

In some embodiments, the delivery drop point further comprises multiple hooks

In some embodiments, the hook is configured to move to move the item.

In some embodiments, the item is delivered via an autonomous delivery vehicle.

In some embodiments, the attachment member is configured to slide to along the hook.

In some embodiments, the hook comprises a plurality of valley structures, wherein the plurality of valley structures are configured to accept the attachment member.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 14A depicts a view of an embodiment of a delivery chute.

FIG. 14B depicts a perspective view of the embodiment of the delivery chute of FIG. 14A.

DETAILED DESCRIPTION

Figure 1B:
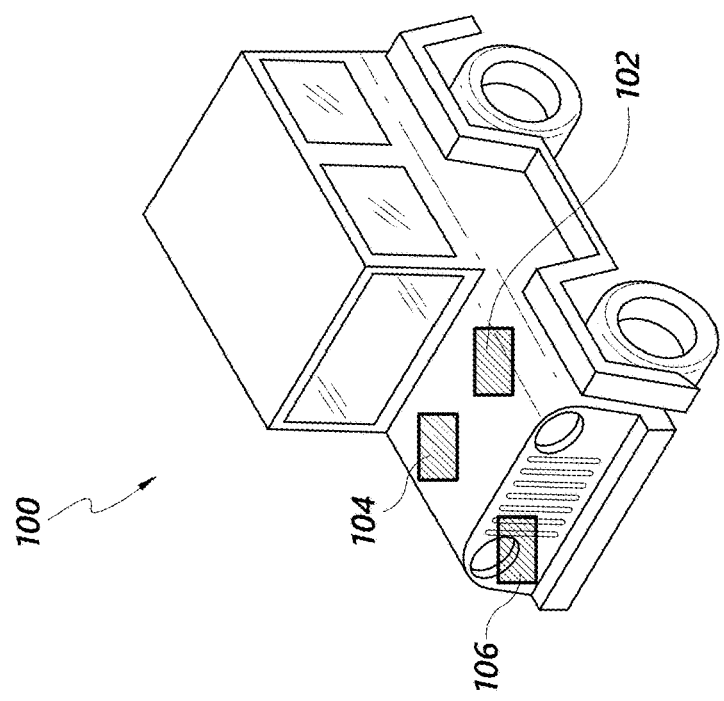
FIG. 1B depicts an embodiment of an aerial delivery vehicle.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Some embodiments herein relate to delivery of items using autonomous delivery drop points for autonomous delivery vehicles. Some embodiments described herein include delivery infrastructure designed for automated delivery. Some embodiments herein relate to delivery by autonomous delivery vehicles including aerial drones, driving drones, and automated vehicles. Some embodiments herein relate to single-family residences, multi-family residences, or other locations configured to receive delivery of an item including commercial buildings and government buildings including schools and post offices.

Items are currently delivered by various distribution entities who deliver to receptacles, such as mailboxes, doorsteps, individualized boxes, and the like. In the case of the United States Postal Service (USPS), a delivery vehicle delivers to multiple addresses within a geographic area. Frequently the delivery vehicle is assigned to a route, which includes a particular set of delivery points, such as addresses of businesses, residences, and the like. This disclosure describes alternatives embodiments to the above, wherein autonomous delivery vehicles may deliver items to a delivery point. Autonomous delivery vehicles may be controlled by a carrier, such as a human being, or may be driverless. The autonomous delivery vehicle may need to recognize the delivery point and stop at each delivery point to deliver the items intended for delivery to each delivery point. The infrastructure at each delivery point may include an autonomous delivery drop point. The autonomous delivery drop point may provide information related to the delivery point. The autonomous delivery drop point may provide security for the item until each item is retrieved by the owner of the item.

For example, the autonomous delivery drop point may include infrastructure for accepting an item delivered by an autonomous delivery vehicle. The infrastructure may be initially closed and opened upon proximity of the autonomous delivery vehicle. At each stop, the autonomous delivery vehicle and the autonomous delivery drop point communicate regarding the delivery of the item. The infrastructure may provide a secure location for the storage of the item until the item is retrieved by the owner of the item. The infrastructure may include a lock, latch, keypad, or other user input device to open the infrastructure to allow retrieval of the item. The infrastructure may be located at any designated location associated with the delivery point including a doorstep, porch, mailbox, or mailroom. The devices and methods described herein can increase efficiency of delivering and storing items at each autonomous delivery drop point.

Again, using the USPS as an example, the autonomous delivery vehicle can be directed toward the autonomous delivery drop point. A series of autonomous delivery drop points may be connected to establish a route. The autonomous delivery vehicle can communicate with the autonomous delivery drop point to change the configuration of the infrastructure associated with the autonomous delivery drop point, for instance, by opening a delivery inlet such as a door or a port into the infrastructure or reconfiguring the infrastructure to provide an empty storage receptacle. The autonomous delivery vehicle can deliver the item to the infrastructure. After delivery, the autonomous delivery drop point can change the configuration of the infrastructure associated with the autonomous delivery drop point, for instance, by closing the delivery inlet such as the door or the port into the infrastructure or by moving the item within the infrastructure. The autonomous delivery vehicle can deliver another item to the autonomous delivery drop point, such as another item to the same owner or another item to a different owner associated with the same autonomous delivery drop point. The autonomous delivery drop point can store one or more items until the owner of the item retrieves the item. The owner of the item can retrieve the item by a user interface such as a lock, keypad, key or other device which can verify identity of the owner of the item. The autonomous delivery vehicle may travel to another autonomous delivery drop point to deliver another item.

As used herein, the autonomous delivery drop point may be fully autonomous or semi-autonomous. The autonomous delivery drop point can receive an input from the autonomous delivery vehicle related to proximity of the autonomous delivery vehicle. The autonomous delivery drop point may require no human interaction in order to accept an item within the infrastructure, store an item within the infrastructure, or move an item within the infrastructure. The autonomous delivery drop point may require no human interaction to open the infrastructure in order to allow delivery of the item to the owner of the item. The terms autonomous and semi-autonomous can be used interchangeably throughout this disclosure. Also as used herein, the term item can refer to mailpieces, envelopes, flats, packages, parcels, or any other deliverable object or commodity.

Figure 1A:
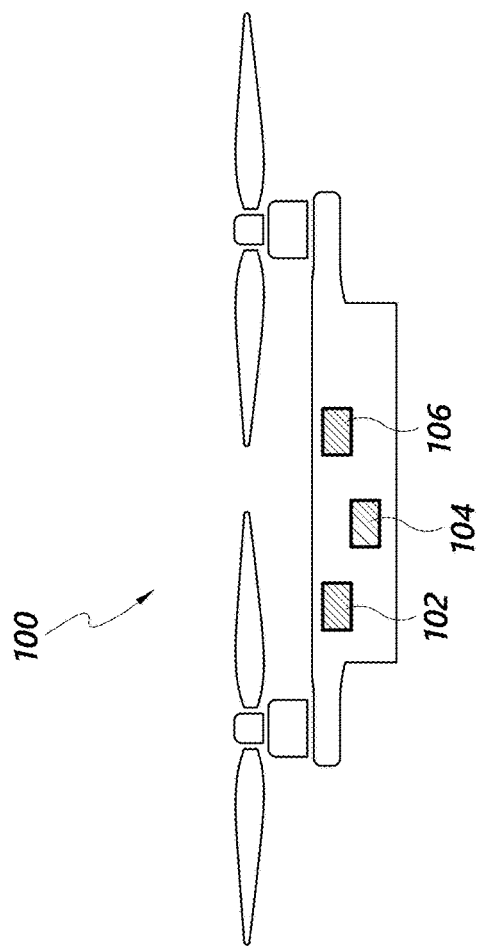
FIG. 1A depicts an embodiment of a ground based delivery vehicle.
Figure 1C:
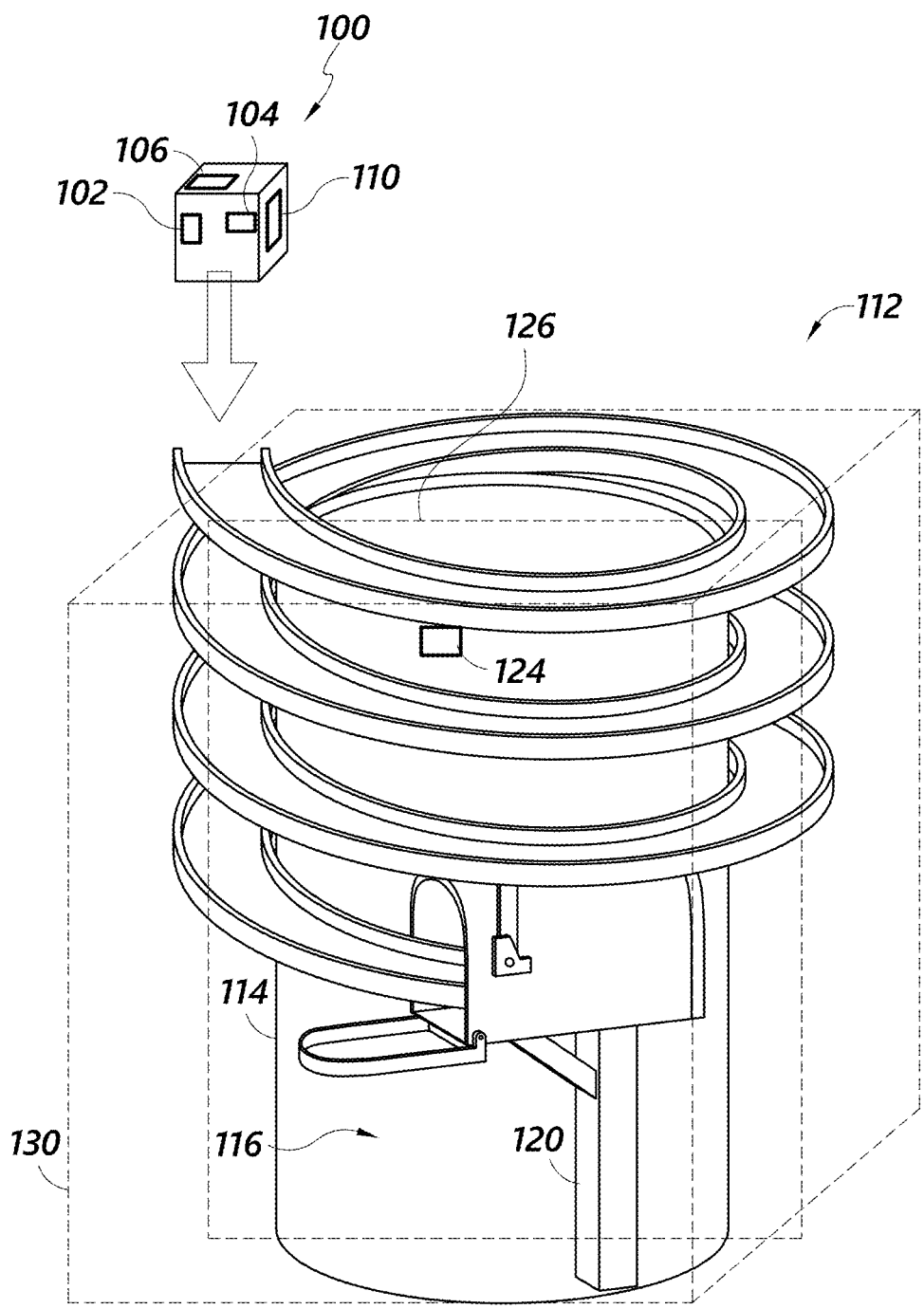
FIG. 1C depicts a perspective view of an embodiment of a tower autonomous delivery drop point.

FIG. 1A illustrates an embodiment of an autonomous delivery vehicle. FIG. 1B illustrates another embodiment of an autonomous delivery vehicle. FIG. 1C is a perspective view of an embodiment of an autonomous delivery drop point. The autonomous delivery drop points described herein are useable with an autonomous delivery vehicle 100. The autonomous delivery vehicle 100 can deliver one or more items. The autonomous delivery vehicle 100 can comprise a central computer 102. The autonomous delivery vehicle comprises one or more sensors and detectors in communication with the central computer 102. The central computer 102 can be in wireless communication with a network. The communication can be a cellular, 3G, 4G, LTE, Wi-Fi, or any other desired communication type or format. The central computer 102 can control one or more of the functions of the autonomous delivery vehicle 100, including steering, acceleration, braking, signaling, and the like, using input and feedback from the one or more sensors.

The autonomous delivery vehicle 100 comprises a location sensor 104. The location sensor 104 can be in communication with the central computer 102. The location sensor 104 can be a global positioning system (GPS), or other spatial location system, including GLONASS, a multilateration system, LORAN, triangulation, and the like. The autonomous delivery vehicle 100 can comprise one or more additional sensors 106 in communication with the central computer 102. The one or more additional sensors 106 can track how far the autonomous delivery vehicle 100 has traveled according to movement of the vehicle's axels, motors, wheels, and the like. The one or more additional sensors 106 can observe road conditions, monitor the vehicle's surroundings, and read traffic signals, such as signs and lights. The one or more additional sensors 106 can be a stereo camera configured to determine distances, triangulate position, and interpret depth and distance of objects within the field of view. The one or more additional sensors 106 can be ultrasonic sensors or radar sensors in communication with the central computer 102. The ultrasonic sensors and radar sensors can be used to detect how far the autonomous delivery vehicle 100 is from an object, to monitor the surroundings, such as the road, lane lines, other vehicles, pedestrians, and the like. The placement of the one or more additional sensors 106 in FIG. 1 is exemplary only.

The autonomous delivery vehicle 100 can comprise a target sensor 110, which can identify the locations of the autonomous delivery drop point. The target sensor 110 can identify targets on the autonomous delivery drop point such as a proxy sensor 124. The target sensor 110 can be a radar detector, RF detector, and the like. In some embodiments, the target sensor 110 can advantageously use a LIDAR system to identify the locations of the autonomous delivery drop point. The target sensor 110 can also be configured to interrogate the autonomous delivery drop point. The target sensor 110 can also be configured to interrogate a sensor on the autonomous delivery drop point such as the proxy sensor 124. The target sensor 110 can also be configured read a response provided by a component of the autonomous delivery drop point. For example, the autonomous delivery drop point may have a proxy sensor such as an RF tag thereon, the RF tag storing specific instructions. The target sensor 110 can activate the tag, in the case of a passive proxy sensor, read the emitted signal from the RF tag, and transmit the information from the emitted signal to the central computer 102.

The autonomous delivery vehicle 100 depicted in FIG. 1 and the relative placement of components is exemplary only. In some embodiments, the autonomous delivery vehicle 100 is a delivery vehicle, such as a truck, a van, a cart, or any other desired type of vehicle. In some embodiments, the autonomous delivery vehicle 100 is an aerial drone. In some embodiments, the autonomous delivery vehicle 100 is driving drone, such as a car or other vehicle. In some embodiments, the autonomous delivery vehicle 100 is any automated vehicle.

Referring again to FIG. 1, the tower autonomous delivery drop point 112 can be installed at a single family residence such as a house. The tower autonomous delivery drop point 112 can be designed to accept one or more items at a time. Since all items should belong to occupants of the single family residence, in some embodiments, the tower autonomous delivery drop point 112 does not discern for a specific recipient.

The tower autonomous delivery drop point 112 comprises a storage receptacle 114. The storage receptacle 114 can store one or more items after delivery. The storage receptacle 114 can include one or more features to facilitate delivery of an item to the owner of the item. The storage receptacle 114 can include a latch (not shown). The latch can be accessible by a key to open the storage receptacle 114. In some embodiments, the latch is coupled to a door (not shown) coupled to the storage receptacle 114 by a hinge (not shown). The key allows the owner of the items to retrieve the items.

The storage receptacle 114 can be coupled to an item receptacle 116 associate with the single family residence such as a mailbox. In some embodiments, the storage receptacle 114 surrounds the item receptacle 116. The item receptacle 116 can be a pre-existing receptacle such as the single family's existing mailbox. The storage receptacle 114 can be designed to retrofit commercially available item receptacle 116. The tower autonomous delivery drop point 112 can fit overtop of existing item receptacle 116. An advantage is that the tower autonomous delivery drop point 112 is compatible with existing infrastructure for item delivery. The item receptacle 116 can include a post 120 designed to anchor the item receptacle 116 to a surface such as the ground. The post 120 can anchor the storage receptacle 114 to the ground. The item receptacle 116 can be designed to function to both send and receive items, such as receiving letters, magazine, and other mail and sending items intended to be picked up by a carrier including the autonomous delivery vehicle 100.

The tower autonomous delivery drop point 112 can include one or more proxy sensors 124 to create a virtual handshake with the autonomous delivery vehicle 100. As used herein, a virtual handshake can include a wireless pairing or transfer of information between two components. For example, a virtual handshake can include communication between an autonomous delivery vehicle 100 and a receptacle. The autonomous delivery vehicle can recognize the receptacle, or a receptacle identifier stored in a passive or active sensor, as described elsewhere herein. The autonomous delivery vehicle 100 can confirm that the receptacle is associated with the distribution network, such as USPS, prior to delivering an item to the receptacle. In some embodiments, the receptacle can also confirm the identity of the autonomous delivery vehicle 100 prior to opening, unlocking, or allowing access to an internal compartment to receive an item from the autonomous delivery vehicle.

The tower autonomous delivery drop point 112 can store information identifying the location of the tower autonomous delivery drop point 112 such as conveying coordinate information including, but not limited to, GPS coordinates, and can broadcast this information for reception by the autonomous delivery vehicle 100. This information can be stored in the proxy sensor 124. In some embodiments, the proxy sensor 124 is a passive proxy sensor. The proxy sensor 124 can be embedded within the tower autonomous delivery drop point 112 to communicate with the autonomous delivery vehicle 100. The proxy sensors 124 can interact with the target sensor 110 of the autonomous delivery vehicle 100. For example, the proxy sensors 124 of the tower autonomous delivery drop point 112 may include an RF tag storing specific instructions. The target sensor 110 can activate the RF tag in the case of a passive RF tag, read the emitted signal from the RF tag, and transmit the information from the emitted signal to the central computer 102. The autonomous delivery vehicle 100 can deliver one or more items to the tower autonomous delivery drop point 112 and continue to the next autonomous delivery drop point. In the illustrated embodiment, the autonomous delivery vehicle 100 can deliver items to the tower autonomous delivery drop point 112 from above, for instance, by an aerial autonomous delivery vehicle 100. In other embodiments, a ground-based autonomous delivery vehicle 100 can extend to the height of the entry to the tower autonomous delivery drop point 112.

The tower autonomous delivery drop point 112 can include a platform 126. The proxy sensor 124 can be embedded in the platform 126. In this embodiment, the item is placed or rests on the platform 126 during delivery. The platform 126 will open inward under the weight of the item. In some embodiments, the platform 126 is designed to open under the weight of 1 pound, but other configurations are contemplated (e.g., 4 ounces, 6 ounces, 8 ounces, 10 ounces, 12 ounces, 14 ounces, 16 ounces, 18 ounces, 20 ounces, 22 ounces, 24 ounces, 26 ounces, 28 ounces, 30 ounces, 32 ounces, etc.). For instance, the weight of the item, acting under the influence of gravity can cause the platform 126 or a portion thereof to pivot inward. In the illustrated embodiment, the platform 126 includes two portions that pivot inward under the weight of the item. In some embodiments, the platform 126 is connected to the body of the tower autonomous delivery drop point 112 by a spring loaded hinge 127 such that when an item of sufficient weight is placed on the platform 126 the platform 126 is forced to spring downward about the hinge 127 creating an open platform door. Other configurations are contemplated.

The tower autonomous delivery drop point 112 can include a slide 128. The slide 128 can be considered a delivery chute. In some embodiments the slide 128 can include rollers to assist the movement of an item down the slide 128. In some embodiments, the slide 128 can include a smooth, low-friction surface to assist items in moving down the slide 128. The item can move down the slide 128 under the influences of gravity. In the illustrated embodiment, the slide 128 is a corkscrew or helical shape. The slide 128 can originate at the platform 126 and extend the height of the tower autonomous delivery drop point 112. The slide 128 can be connected within the body of the tower autonomous delivery drop point 112 through any fastener or mechanism in the art. In some embodiments, the slide 128 is integrally or monolithically formed with the body of the tower autonomous delivery drop point 112. The slide 128 can end at the door of the storage receptacle 114. The slide 128 can facilitate the storage of multiple items along the slide 128. As one item is removed from the tower autonomous delivery drop point 112, one or more additional items may continue to move down the slide 128 under the influence of gravity. The owner can retrieve the one or more additional items from the tower autonomous delivery drop point 112. Other slide configurations are contemplated.

Figure 2:
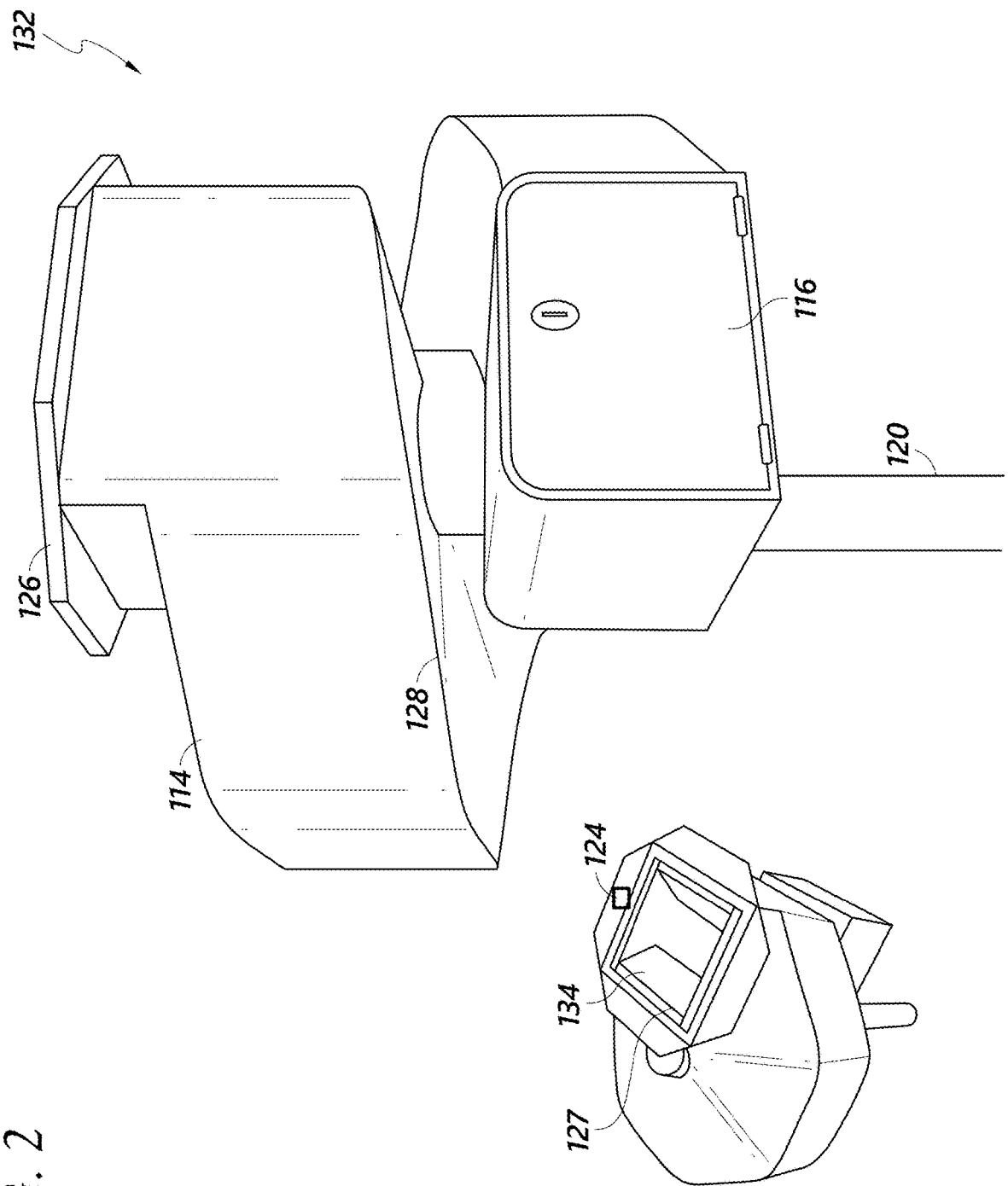
FIG. 2 depicts a perspective view of an embodiment of a compact tower autonomous delivery drop point.

The tower autonomous delivery drop point 112 can include one or more features to reduce the accumulation of debris within the tower autonomous delivery drop point 112. The tower autonomous delivery drop point 112 can include a perforated bottom 130. The perforated bottom 130 can comprise small holes to allow debris such as rainwater or other liquid, leaves, acorns, trash or other particulate to empty from the tower autonomous delivery drop point 112. The tower autonomous delivery drop point 112 can include any feature of any autonomous delivery drop point described herein FIG. 2 depicts a perspective view of a compact tower autonomous delivery drop point 132. The compact tower autonomous delivery drop point 132 can be similar to the tower autonomous delivery drop point 112. The compact tower autonomous delivery drop point 130 can include the storage receptacle 114. The storage receptacle 114 can be coupled to the item receptacle 116 associate with the single family residence. In some embodiments, the storage receptacle 114 creates a delivery chute to the item receptacle 116. The item receptacle 116 can include the post 120 designed to anchor the item receptacle 116 to a surface such as the ground. The compact tower autonomous delivery drop point 132 can include one or more proxy sensors 124 to create a virtual handshake with the autonomous delivery vehicle 100.

The compact tower autonomous delivery drop point 132 can include the platform 126. The proxy sensor 124 can be embedded in the platform 126. The item can be placed on the platform 126 during delivery. The items will be placed on, near, or through the platform 126. The platform 126 can include doors 134 that open.

The compact tower autonomous delivery drop point 132 can include the slide 128. The slide 128 can be considered a delivery chute. The item can move down the slide 128 under the influences of gravity. In the illustrated embodiment, the slide 128 is a corkscrew or helical shape. The slide 128 can originate at the platform 126. The slide 128 can end at the storage receptacle 114. The slide 128 can facilitate the storage of multiple items along the slide 128. The slide 128 can allow ensure a slow delivery of items along the slide 128. The slide 128 can reduce damage to items by slowing the travel of items from a first height to a second, lower height. The item receptacle 116 can be secured such as through a latch and a key, keypad or other device to lock the item receptacle 116.

Figure 3:
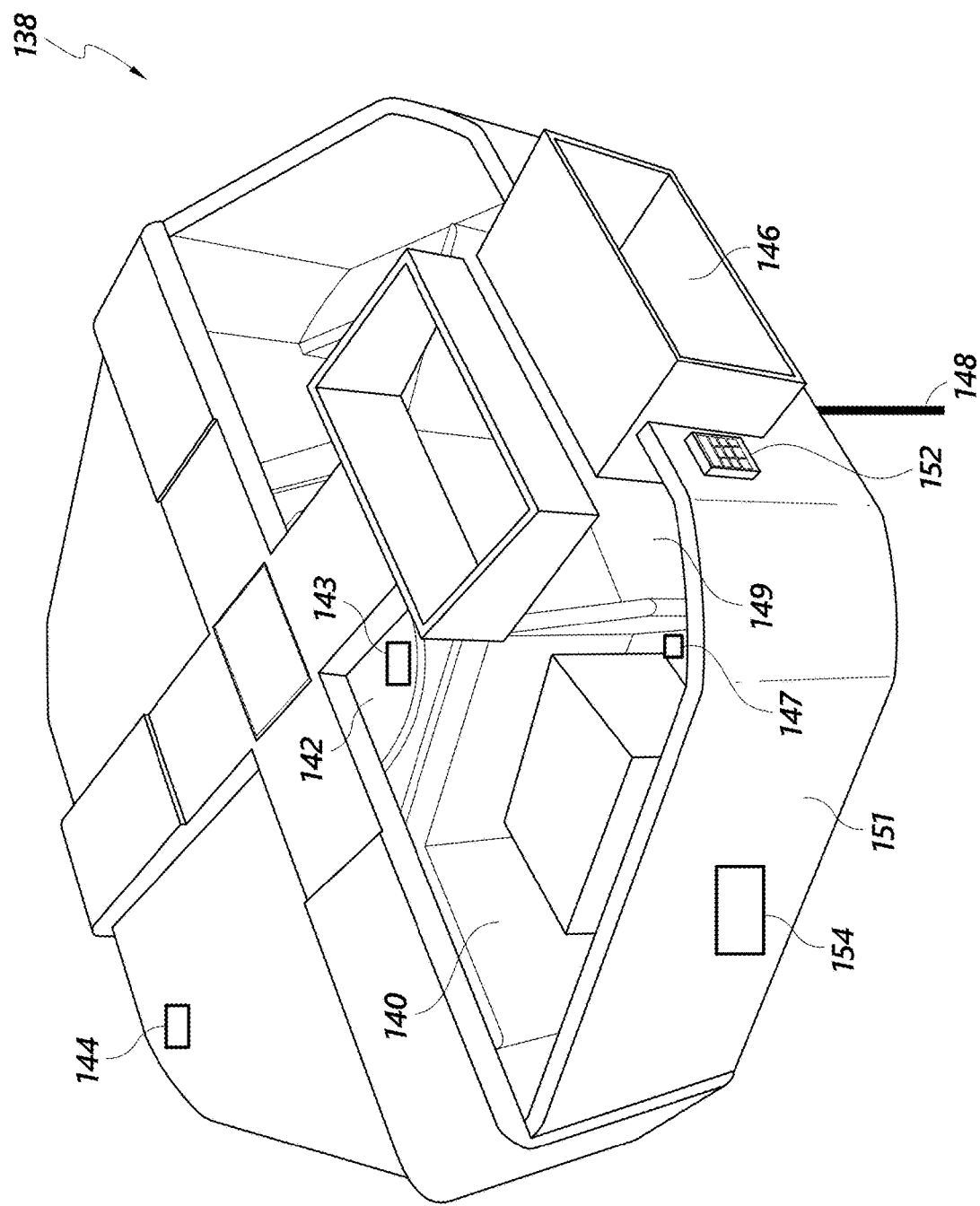
FIG. 3 depicts a perspective view of an embodiment of a honeycomb autonomous delivery drop point.

FIG. 3 depicts a perspective view of an exemplary honeycomb autonomous delivery drop point 138. The honeycomb autonomous delivery drop point 138 may be used in for a single family residence, such as a house, or for a multi-residence building. The honeycomb autonomous delivery drop point 138 can be designed to accept one or more items at a time. Where all items are intended to be delivered to occupants of a single family residence, in some embodiments, the honeycomb autonomous delivery drop point 138 does not discern for a specific recipient. The honeycomb autonomous delivery drop point 138 can comprise multiple storage receptacles 140. In the illustrated embodiment, the honeycomb autonomous delivery drop point 138 comprises six storage receptacles 140 but other configurations are contemplated (e.g., one storage receptacle, two storage receptacles, three storage receptacles, four storage receptacles, five storage receptacles, seven storage receptacles, eight storage receptacles, nine storage receptacles, ten storage receptacles, more than five, more than ten, more than fifteen, etc.). The multiple storage receptacles 140 can surround a central compartment 142. The central compartment 142 can function as the central processor or controller for the honeycomb autonomous delivery drop point 138 by controlling the movement of the multiple storage receptacles 140 as well as performing other functions. The central compartment 142 can include the central processing unit 143 to control the functions of the honeycomb autonomous delivery drop point 138 including acceptance of items, rotation of items, and delivery of items to the owner.

The honeycomb autonomous delivery drop point 138 uses one or more proxy sensors 144 to create a virtual handshake with the autonomous delivery vehicle 100. The central compartment 142 can include one or more proxy sensors 144. The proxy sensors 144 can be active proxy sensors. The proxy sensor 144 can identify the location of the honeycomb autonomous delivery drop point 138. The proxy sensor 144 can interact with the target sensor 110 of the autonomous delivery vehicle 100. For example, the proxy sensor 144 can provide authentication between the honeycomb autonomous delivery drop point 138 and the autonomous delivery vehicle 100. After authentication, the proxy sensor 144 can send a signal to allow the autonomous delivery vehicle 100 access to the honeycomb autonomous delivery drop point 138.

The honeycomb autonomous delivery drop point 138 can include a door 146. The door 146 can be the access point for the autonomous delivery vehicle 100. The door 146 can also be the access point for the owner or occupant to retrieve items, as described herein. Once the proxy sensor 144 detects the autonomous delivery vehicle 100, the proxy sensor 144 can open the door 146. In some embodiments, the door 146 can include one or more magnetic locks. The magnetic locks can attach to magnets on the adjacent wall while the autonomous delivery vehicle 100 is detected. The door 146 can open to allow delivery of an item. In some embodiments, the door 146 is positioned for ground-based deliveries. The door 146 can be positioned to the side or adjacent to the storage receptacle 140. In some embodiments, the door 146 is positioned for aerial deliveries. The door 146 can be positioned above the storage receptacle 140. The door 146 can be a delivery inlet. In some embodiments, the door 146 can be an upward facing door configured to receive an item delivery from an aerial delivery vehicle.

The honeycomb autonomous delivery drop point 138 can include one or more sensors 147 to determine whether an item is present in the storage receptacle 140. The sensor 147 can detect the presence of an item such as through visual inspection. The honeycomb autonomous delivery drop point 138 can detect the weight of the item, such as the force or pressure exerted by the item to determine whether a storage receptacle 140 is empty. The one or more sensors 147 can determine whether an item is present in the accessible location 149. The accessible location 149 can be any storage receptacle 140 that is accessible by the autonomous delivery vehicle 100 for the delivery of an item. The accessible location 149 can be the storage receptacle 140 accessible via the door 146.

If an item is present in the accessible location 149 or the storage receptacle 140 into which the door 146 opened, then the honeycomb autonomous delivery drop point 138 can rotate one or more storage receptacles 140 to provide access to an empty storage receptacle 140. The honeycomb autonomous delivery drop point 138 can rotate the storage receptacles 140 to put an empty storage receptacle 140 first. The central processing unit of the central compartment 142 can rotate the storage receptacles 140 around the x-axis using the gear. The storage receptacles 140 can be rotated until an empty storage receptacle 140 is accessible by the autonomous delivery vehicle 100. The autonomous delivery vehicle 100 can pass the item through the door 146 and into the empty storage receptacle 140.

The honeycomb autonomous delivery drop point 138 can rotate to provide another empty storage receptacle 140 to the autonomous delivery vehicle 100 for the delivery of another item. For example, when a storage receptacle 140 receives an item, the storage receptacles 140 can rotate around the central compartment 142 to position an empty one of the storage receptacles 140 in alignment with the door 146. The autonomous delivery vehicle 100 can leave several deliveries at a single location before the items are retrieved by the owner of the items or the occupant of the residence. An advantage is that the honeycomb autonomous delivery drop point 138 allows for a high volume of deliveries to a single family residence.

The honeycomb autonomous delivery drop point 138 can include several features to enhance security. The honeycomb autonomous delivery drop point 138 can include a stake 148. The honeycomb autonomous delivery drop point 138 can be secured to the ground or other structure with the stake 148. The honeycomb autonomous delivery drop point 138 can include one or more sensors to determine if the honeycomb autonomous delivery drop point 138 is secured via the stake 148. If the stake 148 cannot be detected to be in the ground or otherwise secured, the honeycomb autonomous delivery drop point 138 can include an alarm which can be triggered. The alarm may prevent further delivery of items to the honeycomb autonomous delivery drop point 138 or may alert the owner to a problem with the security of the honeycomb autonomous delivery drop point 138. The central compartment 142 can include the alarm. The honeycomb autonomous delivery drop point 138 can include a protective casing 151. The protective casing 151 can protect the contents of the honeycomb autonomous delivery drop point 138 such as items, storage receptacles 140, and the central compartment 142. The protective casing 151 can protect from weather and light damage. If the protective casing 151 is breached, the alarm can be triggered.

The honeycomb autonomous delivery drop point 138 can include several features to receive and store one or more items. The central compartment 142 can include a gear (not shown) or other movement device to rotate the storage receptacles 140. The interior facing sides of the storage receptacles 140 can have corresponding gears, grips, or other features to engage the gear (not shown) or other movement device. The honeycomb autonomous delivery drop point 138 can allow the storage receptacles 140 to be rotated toward or away from the position accessible by the autonomous delivery vehicle 100, such as the position accessible by the door 146. In some embodiments, the storage receptacles 140 can be connected to the central compartment 142. The central compartment 142 can rotate to cause rotation of all of the storage receptacles 140 connected thereto. The central compartment 142 can include any movement mechanism including gears, cog, ratchets, belts, etc. to cause movement of the storage receptacles 140. In other embodiments, the storage receptacles 140 rotate relative to a stationary central compartment 142. The honeycomb autonomous delivery drop point 138 can include a platform upon which the one or more storage receptacles 140 can sit. The platform can rotate causing the storage receptacles 140 to rotate. In some embodiments, the storage receptacles 140 rotate about the central compartment. In some embodiments, the storage receptacles 140 rotate about the central axis. In some embodiments, the storage receptacles 140 rotate along a path such as a non-linear path through the honeycomb autonomous delivery drop point 138.

The honeycomb autonomous delivery drop point 138 can include several features to retrieve one or more items. The honeycomb autonomous delivery drop point 138 can include a keypad 152 which allows the user to access the honeycomb autonomous delivery drop point 138 by disengaging the lock on the door 146. In some embodiments, before allowing access via the door 146, the honeycomb autonomous delivery drop point 138 can rotate the storage receptacles 140 such that the storage receptacle 140 with the item is accessible via the door 146. In other embodiments, the honeycomb autonomous delivery drop point 138 can rotate the storage receptacles 140 after the owner unlocks the door 146. The honeycomb autonomous delivery drop point 138 can rotate the storage receptacles 140 such that another item from another storage receptacle is available to be retrieved by the owner or occupant. In some embodiments, the rotation is controlled by the user. In other embodiments, the honeycomb autonomous delivery drop point 138 will rotate upon input of the keypad but before opening the door 146.

The honeycomb autonomous delivery drop point 138 can include additional features such as a charging station 154. The charging station 154 can allow the autonomous delivery vehicle 100 to charge. The honeycomb autonomous delivery drop point 138 can include solar cells or another energy source to allow the honeycomb autonomous delivery drop point 138 to perform functions such as rotating the storage receptacles 140. The honeycomb autonomous delivery drop point 138 can be used for the owner to send one or more items. The owner can place one or more items for pickup within one or more storage receptacles 140. In some embodiments, certain storage receptacles 140 are designated as pickup storage receptacles 140. In some embodiments, the processing unit of the central compartment 142 can detect when the owner of the item or other occupant places the item for pickup for instance by detecting entry using the keypad 152. The honeycomb autonomous delivery drop point 138 can include any feature of any autonomous delivery drop point described herein.

Figure 4:
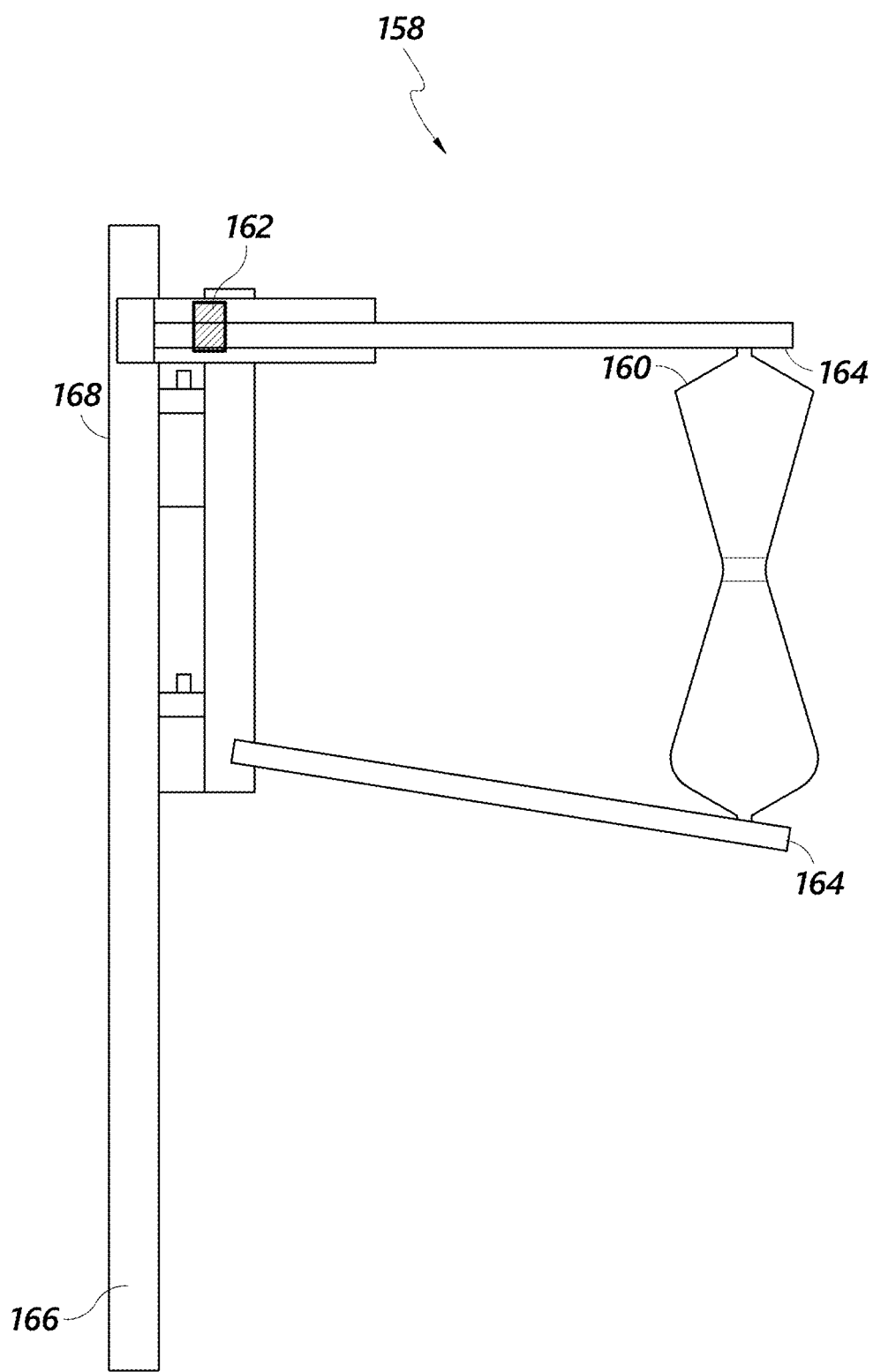
FIG. 4 depicts a side elevation view of an embodiment of a hook autonomous delivery drop point.

FIG. 4 depicts a side elevation view of a hook autonomous delivery drop point 158. The hook autonomous delivery drop point 158 can be used for a single family residence such as a house. The hook autonomous delivery drop point 158 can accept one or more items at a time. Since all items are intended for or are addressed to occupants of the single family residence, in some embodiments, the hook autonomous delivery drop point 158 does not discern for a specific recipient. In some embodiments, the receptacle can be considered a surface. The connection points are the hooks coupled to the item. The hooks can secure the item to the hook autonomous delivery drop point 158.

FIG. 4 illustrates components of the hook autonomous delivery drop point 158. In this embodiment, the receptacle does not enclose the item. Rather, the receptacle is a position or surface designed to accept an item. Prior to delivery, the item can include an attachment member 160 coupled thereto, such as a loop. The attachment member 160 can be any mechanism that allows the item to be held by the hook autonomous delivery drop point 158. The hook autonomous delivery drop point 158 includes a hook 164. The hook 164 can be any extension with a surface designed to accept the item. In the illustrated embodiment, the hook 164 is configured to couple with the attachment member 160 to receive the item As described herein, the autonomous delivery vehicle 100 can deliver an item. The autonomous delivery vehicle 100 can communicate geospatial data with a proxy sensor 162. The proxy sensor 162 can be located on or in the hook autonomous delivery drop point 158. The proxy sensor 162 can be a passive proxy sensor. In some embodiments, the proxy sensor 162 can be located on a surface of the hook 164. The proxy sensor 162 can communicate with the autonomous delivery vehicle 100, indirectly where the item is to be dropped. The proxy sensor 162 can communicate instructions including how to secure the item to the hook 164 of the hook autonomous delivery drop point 158 with the autonomous delivery vehicle 100. After receiving instructions and/or positional information, the autonomous delivery vehicle 100 can deliver the item. The autonomous delivery vehicle 100 can continue on its way, for instance, along the route to another autonomous delivery drop point.

The hook autonomous delivery drop point 158 can include structures to support the items. The hook autonomous delivery drop point 158 can include a stake 166. The hook autonomous delivery drop point 158 is secured to the ground or other structure with the stake 166. The hook autonomous delivery drop point 158 can include a pole 168. In some embodiments, the pole 168 can telescope to adjust the height of the hook 164 relative to the ground. The adjustable pole 168 can allow for the delivery from several kinds of autonomous delivery vehicle 100, including aerial and ground based autonomous delivery vehicles. The hook autonomous delivery drop point 158 can be placed on a balcony or porch of the residence, rather than on the street as with other types of delivery receptacles. The hook autonomous delivery drop point 158 can include one or more features to enhance the securement of the hook autonomous delivery drop point 158. The hook autonomous delivery drop point 158 can allow for exception handling, for instance for items that should not be secured to the hook 164. The autonomous delivery vehicle 100 can deliver these items in another manner, for instance by placing these items near the hook autonomous delivery drop point 158. The hook autonomous delivery drop point 158 can include any feature of any autonomous delivery drop point described herein.

Figure 5:
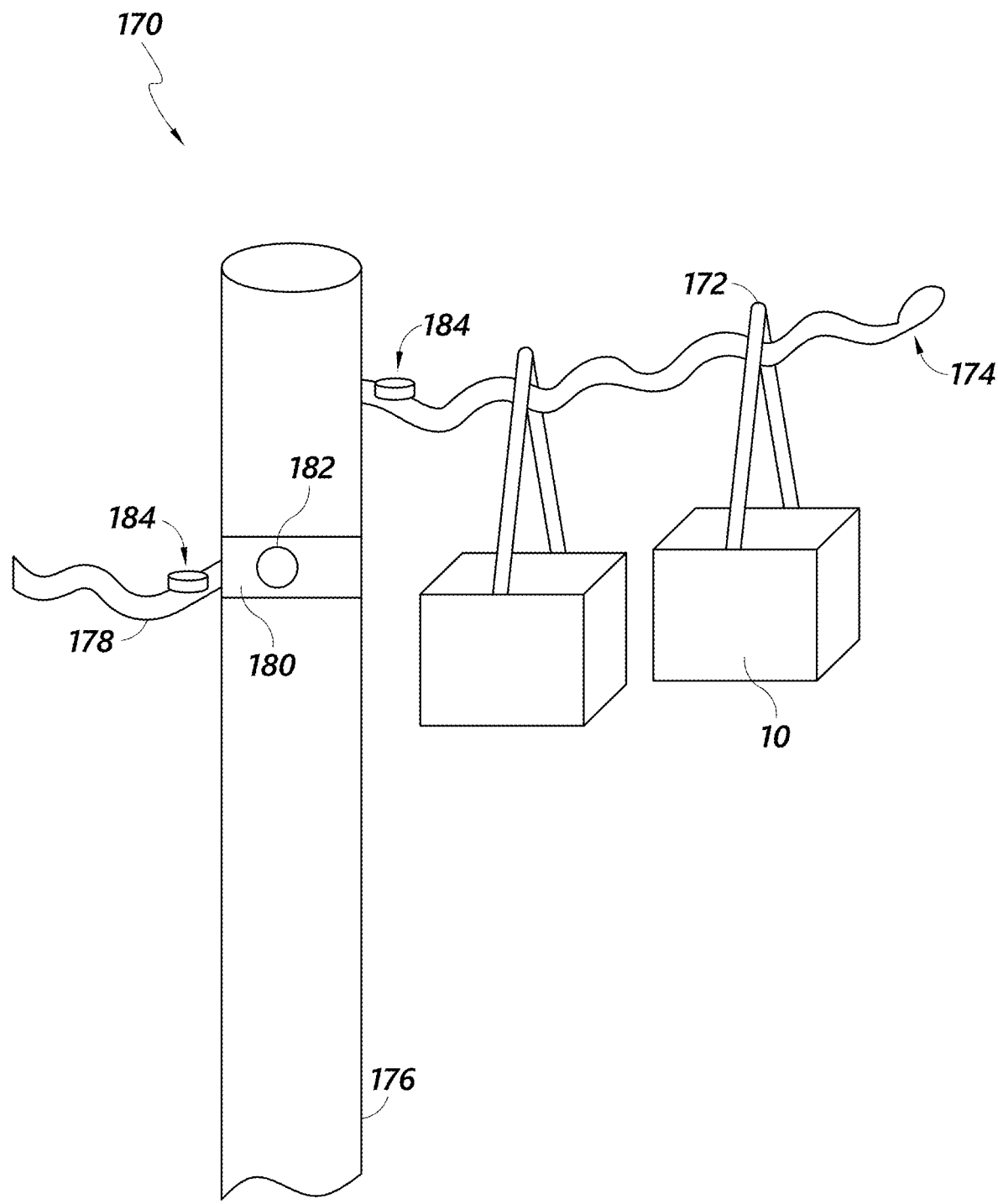
FIG. 5 depicts a perspective view of an embodiment of a multi-hook autonomous delivery drop point.

FIG. 5 depicts a perspective view of a multi-hook autonomous delivery drop point 170. The multi-hook autonomous delivery drop point 170 can be used for a single family residence such as a house. The multi-hook autonomous delivery drop point 170 can be designed to accept one or more items at a time. Since all items are to be delivered to occupants of the single family residence, in some embodiments, the multi-hook autonomous delivery drop point 170 does not discern for a specific recipient.

The multi-hook autonomous delivery drop point 170 can include structures to support the items. The multi-hook autonomous delivery drop point 170 can include a reinforced pole 176. The multi-hook autonomous delivery drop point 170 can be secured to the ground or other structure with the reinforced pole 176. The reinforced pole 176 would need to hold a percentage of the maximum weight of possible deliveries. In some embodiments, the reinforced pole 176 holds 120% of the maximum weight of possible deliveries. In some embodiments, the reinforced pole 176 holds up to one ounce, 5 ounces, 10 ounces, 1 pound, up to ten pounds, up to twenty pounds, up to thirty pounds, up to forty pound, up to fifty pounds, up to sixty pounds, up to seventy pounds, up to eighty pounds, up to ninety pounds, or up to one hundred pounds. Other configurations are contemplated.

The multi-hook autonomous delivery drop point 170 can include structures to hold the items. The multi-hook autonomous delivery drop point 170 can include a multi-item hook 174. The multi-item hook 174 can be coupled to the reinforced pole 176 and can extend away from the reinforced pole 176 at an upward angle from a plane perpendicular to a long axis of the reinforced pole 176. The multi-item hook 174 can have a wavy configuration. The ribs and recesses of the wave of the multi-item hook 174 can be resting places for an attachment member 172 of on an item 10, such as a loop, a hook, a portion of a delivery satchel or other type of delivery mechanism. The multi-item hook 174 can comprise a high strength metallic extension.

The multi-hook autonomous delivery drop point 170 can include one or more additional delivery hooks 178. The one or more additional delivery hooks 178 can include any of the features of the multi-item hook 174 described herein. Additional delivery hooks 178 can be placed on one multi-hook autonomous delivery drop point 170 given that the spacing and strength of reinforced pole 176 is sufficient. The additional delivery hooks 178 can extend from the reinforced pole 176 like hooks on a coat rack. The additional delivery hooks 178 can form a spiral or any other configuration enabling support and separation of the items 10. The additional delivery hooks 178 can have an adjustable configuration, such as a telescoping design.

In some embodiments, the multi-item hook 174 or the additional delivery hook 178 can be coupled to the reinforced pole 176 by a rotating sleeve 180 coupled to the reinforced pole 176. The rotating sleeve 180 can allow the multi-item hook 174 or the additional delivery hook 178 to rotate relative to the reinforced pole 176. The multi-item hook 174 or the additional delivery hook 178 can couple to the rotating sleeve 180 via a lock 182. The lock 182 can secure the multi-item hook 174 to the rotating sleeve 180. The lock 182 can secure the additional delivery hook 178 to the rotating sleeve 180. The lock 182 can limit rotation and translation of the hook 174, 178 relative to the rotating sleeve 180.

Prior to delivery, the item 10 can include an attachment member 172 coupled thereto. The attachment member 172 can be a strap. The attachment member 172 can be a loop. The item can be modified with the attachment member 172 on the top of the item 10. The attachment member 172 can be specially designed for each item 10. The attachment member 172 must be strong enough to hold the weight of the item. In some embodiments, the attachment member 172 is designed to hold five pounds of weight but other configurations are contemplated (e.g., one pound, two pounds, three pounds, four pound, six pound, seven pounds, eight pounds, nine pounds, ten pounds, up to ten pounds, up to twenty pounds, up to thirty pounds, up to forty pound, up to fifty pounds, up to sixty pounds, up to seventy pounds, up to eighty pounds, up to ninety pounds, up to one hundred pounds, etc.). The attachment member 172 is designed to hold the item in poor weather such as rain, sleet, snow, wind, and extreme temperatures. The attachment member 172 can comprise any material to enable the attachment member 172 to hold the item and transport the item. In some embodiments, the multi-hook autonomous delivery drop point 170 can include a separate casing that goes over one or more items. The casing can protect the items from damage such as from weather or light.

In this way, the reinforced pole 176 provides support for the item and the multi-item hook 174 connected thereto. The rotating sleeve 180 can be affixed to the reinforced pole 176 by a securing device such as the lock 182. The multi-item hook 174 can comprise any material sufficient to support the weight of the item, such as a metal or composite material. The multi-item hook 174 and the additional delivery hook 178 are configured to define ribs or indentations recurring along the length of the multi-item hook 174 and the additional delivery hook 178.

In some embodiments, the multi-hook autonomous delivery drop point 170 can include a variable or modular design such that the multi-hook autonomous delivery drop point 170 can be reconfigured by the user. In some embodiments, the multi-hook autonomous delivery drop point 170 can include motorized or intelligent multi-item hook 174 or additional delivery hook 178. In some embodiments, the multi-hook autonomous delivery drop point 170 can include security features such as latches (not shown) on each multi-item hook 174 or additional delivery hook 178. In some embodiments, the latch can be located between the multi-item hook 174 and the additional delivery hook 178. The multi-item hook 174 and the additional delivery hook 178 can be positioned such that the free ends of the multi-item hook 174 and the additional delivery hook 178 are parallel or adjacent to each other. The latch can couple the free ends of the two hooks 174, 178 such that the items cannot be removed from the delivery drop point 170. In some embodiments, the latch functions as a check valve on the hooks. For example, the latch can be disposed at the free end of hook. The latch allows a strap to move in a first direction, from the free end of the hook 174 to the reinforced pole 176. The latch also prevents movement in a second direction, from the reinforced pole 176 toward the free end of the hook 174. The latch can have a key or other similar mechanism that can be operated by a user to defeat the check valve function, or the one directional movement, in order remove the item 10 from the hook. Other means of preventing unintended removal of the items are contemplated. The multi-hook autonomous delivery drop point 170 can include a trap door (not shown). The trap door can collect items after delivery. The trap door can store the items until retrieval.

The autonomous delivery vehicle 100 can deliver an item 10. The autonomous delivery vehicle 100 can communicate geospatial data with a proxy sensor 184 located on or in the multi-hook autonomous delivery drop point 170. The proxy sensor 184 can be active or passive. The proxy sensor 184 can provide information relevant for delivery of the item 10. The proxy sensor 184 can communicate with the autonomous delivery vehicle 100 with instructions regarding location for dropping the item. The proxy sensor 184 can communicate to the autonomous delivery vehicle 100 instructions including how to secure the item to the multi-hook autonomous delivery drop point 170. The proxy sensor 184 can provide dimensions of the multi-item hook 174 to the autonomous delivery vehicle 100. The proxy sensor 184 can provide dimensions of the additional delivery hook 178 to the autonomous delivery vehicle 100. The proxy sensor 184 can provide location data for the autonomous delivery vehicle 100. The proxy sensor 184 can track the number of available delivery spots on the multi-item hook 174. The proxy sensor 184 can direct the autonomous delivery vehicle 100 to other delivery spots if certain delivery spots are full. As one example, the proxy sensor 184 can direct the autonomous delivery vehicle 100 to the additional delivery hook 178 if the multi-item hook 174 has items in all of the available ribs or indentations of the multi-item hook 174. For instance, one or more sensors can indicate that the multi-item hook 174 is not available for delivery. In some embodiments, a delivery counter or scale can determine if the multi-item hook 174 is not available for delivery. The proxy sensor 184 can direct the autonomous delivery vehicle 100 to the additional delivery hook 178 if the multi-item hook 174 is at or near the maximum weight limit of the multi-item hook 174. The proxy sensor 184 can communicate with any additional sensors or detectors to be able to perform these functions. The proxy sensor 184 can include a processor. The proxy sensor 184 can include a memory to store information and/or instructions. The proxy sensor 184 can communicate the information and/or instructions via RF as described herein. The proxy sensor 184 can communicate in response to a request from the autonomous delivery vehicle 100.

The item 10 can be stored on the multi-item hook 174 or the additional delivery hook 178 until retrieved by the user. The attachment member 172 is designed to hold the weight of the item 10 during storage. The attachment member 172 rests within a rib or indentation of the multi-item hook 174 or the additional delivery hook 178 during storage. In some embodiments, the user retrieves the items by pulling the item along the multi-item hook 174 or the additional delivery hook 178. The attachment member 172 is designed to slide over the ribs of the multi-item hook 174 during retrieval of the item. In some embodiments, the multi-item hook 174 or the additional delivery hook 178 are tilted downward during retrieval of the item 10. The items can slide along the multi-item hook 174 or the additional delivery hook 178 toward the user. In some embodiments, the owner inputs information to pivot the multi-item hook 174, such as a virtual handshake. The attachment member 172 can include a roller to enable the attachment member 172 to slide along the multi-item hook 174 to the lowest point. The multi-item hook 174 can include a very low coefficient of friction. The low coefficient of friction can allow the attachment member 172 of the item to slide along the multi-item hook 174. The ribs of the multi-item hook 174 are sized to slow a deposited item as the item passes over the ribs. The recesses of each rib would hold each item in sequence after the item is delivered. In some embodiments, each recess is designed to hold one item.

In some embodiments, the owner can place one or more items for pickup on one or more hooks 174, 178. In some embodiments, certain hooks 174, 178 or recesses of hooks 174, 178 are designated as pickup locations. The multi-hook autonomous delivery drop point 170 can include a drop off hook and a pick up hook. The autonomous delivery vehicle 100 can pick up the items from the hooks 174, 178.

Figure 6A:
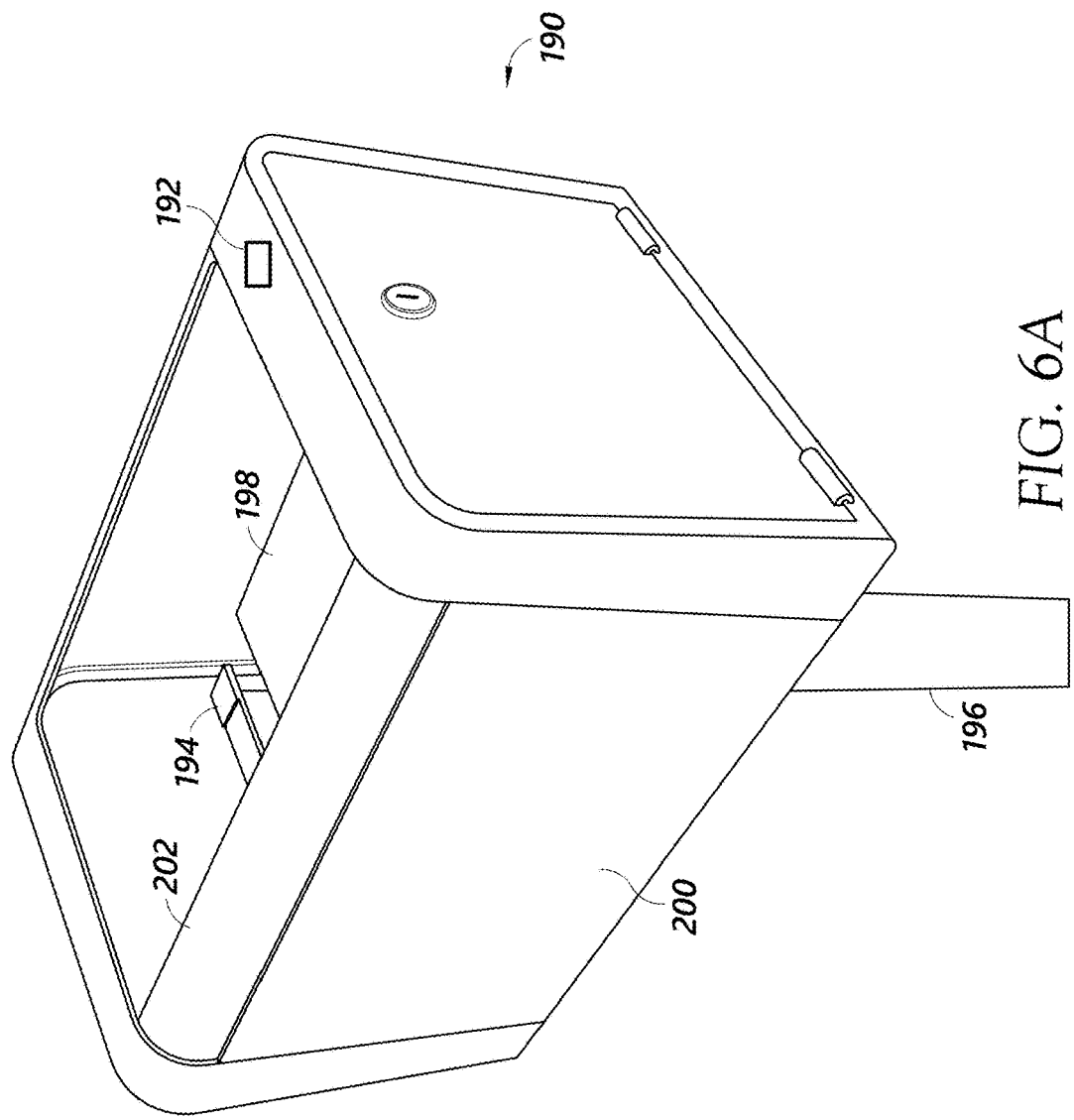
FIGS. 6A and 6B depict a perspective view of an embodiment of a lotus autonomous delivery drop point.

FIG. 6A depicts a perspective view of a lotus autonomous delivery drop point 190. The lotus autonomous delivery drop point 190 can be used for a single family residence such as a house. The lotus autonomous delivery drop point 190 can be designed to accept one or more items at a time. Since all items are to be delivered to occupants of the single family residence, in some embodiments, the lotus autonomous delivery drop point 190 does not discern for a specific recipient.

The lotus autonomous delivery drop point 190 can include a lotus box 200. The lotus box 200 can include one or more doors 202 that open to allow for delivery. The door 202 can be a delivery inlet. The lotus autonomous delivery drop point 190 can include a platform 198. In some embodiments, the platform 198 can be external to the lotus box 200. The platform 198 can be internal to the lotus box, as shown in FIG. 6A. The platform 198 is designed to hold the weight of one or more items. In some embodiments, the platform 198 is designed to hold fifteen pounds of weight but other configurations of maximum weight are contemplated (e.g., one pound, two pounds, three pounds, four pound, six pound, seven pounds, eight pounds, nine pounds, ten pounds, up to ten pounds, up to twenty pounds, up to thirty pounds, up to forty pound, up to fifty pounds, up to sixty pounds, up to seventy pounds, up to eighty pounds, up to ninety pounds, up to one hundred pounds, etc.).

The lotus autonomous delivery drop point 190 can include several features to enhance security. The lotus autonomous delivery drop point 190 can include a stake 196. The lotus autonomous delivery drop point 190 can be secured to the ground or other structure with the stake 196. The stake 196 can be coupled to the lotus box 200. The stake 196 can be approximately 2 feet tall. Other configurations of dimensions of the stake 196 are contemplated (e.g., one foot, three feet, four feet, five feet, etc.).

The lotus autonomous delivery drop point 190 can include one or more features to reduce the accumulation of debris within the lotus autonomous delivery drop point 190. The lotus autonomous delivery drop point 190 can include a perforated bottom. The perforated bottom can comprise small holes to allow debris such as rainwater or other liquid, leaves, acorns, trash or other particulate to empty from the lotus autonomous delivery drop point 190.

The lotus autonomous delivery drop point 190 uses one or more proxy sensors 192 to create a virtual handshake with the autonomous delivery vehicle 100. The proxy sensor 192 can be passive. The proxy sensor 192 can identify the location of lotus autonomous delivery drop point 190. The proxy sensor 192 can be embedded within the lotus autonomous delivery drop point 190 to communicate with the autonomous delivery vehicle 100. The proxy sensor 194 can be coupled to the one or more doors 202. The proxy sensor 194 can be coupled to the platform 198. The proxy sensor 192 can interact with the target sensor 110 of the autonomous delivery vehicle 100. The proxy sensor 192 may have an RF tag storing specific instructions. The target sensor 110 can activate the tag, in the case of a passive RF tag, read the emitted signal from the RF tag, and transmit the information from the emitted signal to the central computer 102. The proxy sensor 192 can provide information when activated or pinged by the autonomous delivery vehicle 100.

The autonomous delivery vehicle 100 can be an aerial autonomous delivery vehicle. The autonomous delivery vehicle 100 can fly overhead and obtain the necessary geospatial information for delivery by pinging the proxy sensor 192. The proxy sensor 192 can indicate the position of the lotus autonomous delivery drop point 190 when pinged by the autonomous delivery vehicle 100. The proxy sensor 192 can be in or on the lotus autonomous delivery drop point 190. Upon communication with the autonomous delivery vehicle 100, the lotus autonomous delivery drop point 190 can open for deposit of the item. In some embodiments, the autonomous delivery vehicle 100 opens the one or more doors 202. In some embodiment, the one or more doors 202 are in a normally open position, or remain open until delivery of an item.

Figure 6B:
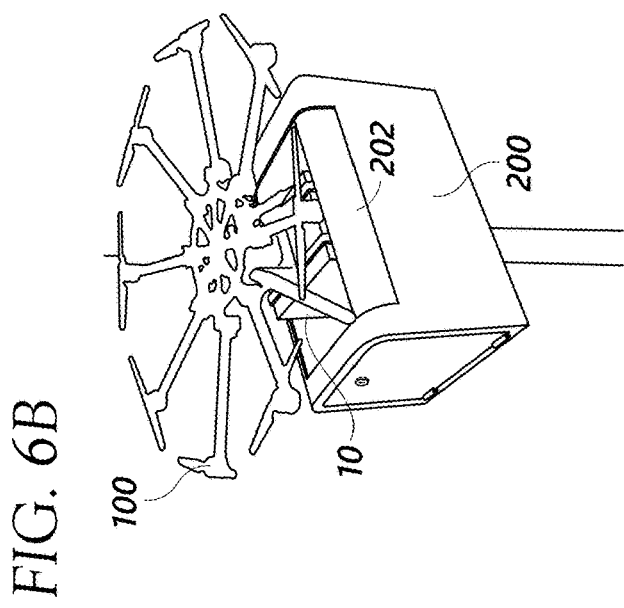

As shown in FIG. 6B, the autonomous delivery vehicle 100 can position itself over the opening in the lotus box 200 and insert the item 10 to be delivered into the lotus box 200. The lotus autonomous delivery drop point 190 can close once the presence sensor 194 detects the item. In some embodiments, the autonomous delivery vehicle 100 causes one or more arms 204 to retract from the one or more doors 202 and into the lotus box 200. In some embodiments, the autonomous delivery vehicle 100 closes the one or more doors 202. In some embodiment, the one or more doors 202 remain open after delivery of an item. In some embodiments, the autonomous delivery vehicle 100 sends a signal to a motor or other device capable of providing a motive force to the doors 202 of the receptacle. This signal can cause the doors 202 to open in response to the presence of the autonomous delivery vehicle 100. In some embodiments, the lotus autonomous delivery drop point 190 can comprise a sensor 194 which presence of one or more items. The sensor 194 can detect the weight of the one or more items. Other sensors are contemplated such as a pressure or force sensor.

The lotus autonomous delivery drop point 190 can use mechanical energy to open or close the lotus autonomous delivery drop point 190, such as by opening or closing one or more doors 202 and/or one or more arms 204. For instance, the weight of the item on the platform 198 can exert a force on the platform 198, which is mechanically coupled to the doors 202, and the downward force of the item will cause the one or more doors 202 to close. For instance, the weight of the item can open the one or more doors 202 and/or one or more arms 204 of the lotus autonomous delivery drop point 190. The lotus box 200 can close using stored mechanical energy once an item of significant size triggers the lotus box 200. In some embodiments, the lotus box 200 is open. The lotus box 200 can close when the weight of the item triggers an internal mechanism of the lotus box 200.

The weight of the item can close the doors 202. For instance, the lotus box 200 can include springs that bias doors 202 to close upon the delivery of an item. For instance, the lotus box 200 can include shock system that lowers the item downward through the one or more open doors 202 upon the delivery of an item. The lotus box 200 can include any internal mechanism that can convert the weight or pressure of the item into movement of one or more doors 202. As one example, the potential energy of the item based on the weight will transform into kinetic energy to close the lotus box 200. In some embodiments, the maximum weight that the platform 198 can hold does not include the lotus box 200. Other configurations are contemplated. The lotus box 200 can close when one or more sensors triggers an internal mechanism of the lotus box 200.

The lotus autonomous delivery drop point 190 can include several features to retrieve one or more items. The user can cause the lotus box 202 to reopen. In some methods of use, the doors 202 remain open after delivery of an item. In other methods of use, the doors 202 are closed after delivery on an item. The user can open the lotus box 200 with a user input, such as a key or keypad. The lotus autonomous delivery drop point 190 can include any feature of any autonomous delivery drop point described herein.

Figure 7:
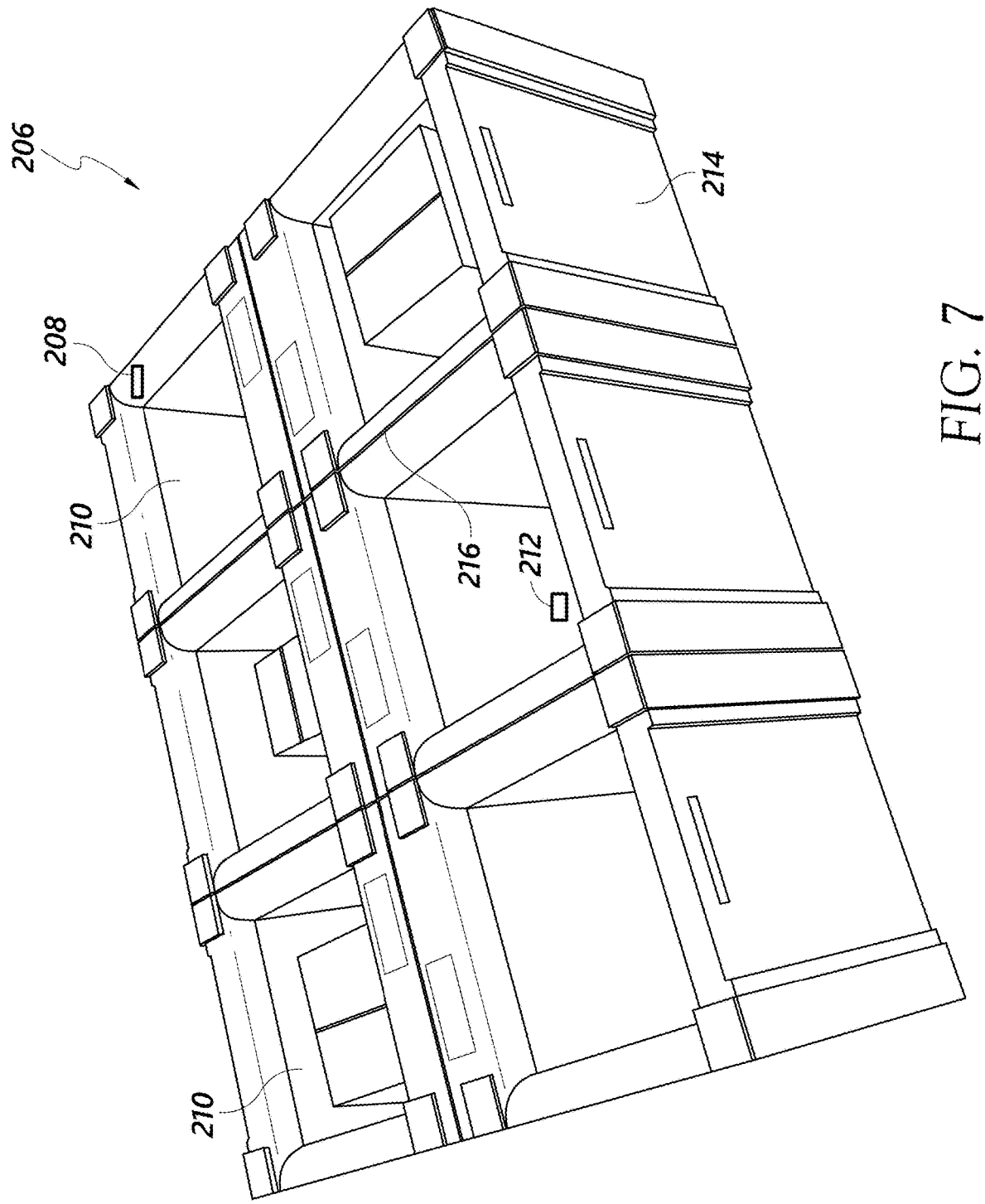
FIG. 7 depicts a perspective view of an embodiment of a dropbox autonomous delivery drop point.

FIG. 7 depicts a perspective view of a dropbox autonomous delivery drop point 206. The dropbox autonomous delivery drop point 206 can be used for a single family residence such as a house. The dropbox autonomous delivery drop point 206 can be designed to accept one or more items at a time. Since all items are intended to be delivered to occupants of the single family residence, in some embodiments, the dropbox autonomous delivery drop point 206 does not discern for a specific recipient.

The dropbox autonomous delivery drop point 206 uses one or more proxy sensors 208 to create a virtual handshake with the autonomous delivery vehicle 100. The proxy sensor 208 can be an active proxy sensor. The proxy sensor 208 can identify the location of dropbox autonomous delivery drop point 206. The proxy sensor 208 can be embedded within the dropbox autonomous delivery drop point 206 to communicate with the autonomous delivery vehicle 100. The proxy sensor 208 can interact with the target sensor 110 of the autonomous delivery vehicle 100.

The autonomous delivery vehicle 100 can be an aerial autonomous delivery vehicle. The autonomous delivery vehicle 100 can fly overhead and obtain the necessary geospatial information for delivery by pinging the proxy sensor 208. The proxy sensor 208 can indicate the position of the dropbox autonomous delivery drop point 206 when pinged by the autonomous delivery vehicle 100. The proxy sensor 208 can be in or on the dropbox autonomous delivery drop point 206. The dropbox autonomous delivery drop point 206 can be positioned on a roof of a residence. The dropbox autonomous delivery drop point 206 can be positioned at a location accessible to the autonomous delivery vehicle 100. The dropbox autonomous delivery drop point 206 can be used for aerial deliveries. The dropbox autonomous delivery drop point 206 can be used for ground-based deliveries.

The dropbox autonomous delivery drop point 206 can comprise multiple storage receptacles 210. In the illustrated embodiment, the dropbox autonomous delivery drop point 206 comprises six storage receptacles 210 but other configurations are contemplated (e.g., one storage receptacle, two storage receptacles, three storage receptacles, four storage receptacles, five storage receptacles, seven storage receptacles, eight storage receptacles, nine storage receptacles, ten storage receptacles, more than five, more than ten, more than fifteen, etc.). Each storage receptacle 210 can comprise one or more drop points. A drop point is a location configured to receive an item. The storage receptacle 210 can be designed to hold one or more items. In some embodiments, the items are not stacked on top of each other within the storage receptacle 210. The storage receptacle 210 can provide a level of singularity for family members or occupants of a residence. For example, each member or occupant of a residence can be assigned a receptacle. The item for delivery can have the name of an individual occupant thereon, and the autonomous delivery vehicle 100 can be directed to the receptacle assigned to the individual whose name is on the item for delivery.

In some embodiments, each storage receptacle 210 can comprise a proxy sensor 208. Each proxy sensor 208 can be embedded into a specific box to communicate with the autonomous delivery vehicle 100. The proxy sensor 208 communicates where to drop off the item. The proxy sensor 208 within each storage receptacle 210 can communicate with the autonomous delivery vehicle 100 whether the storage receptacle 210 is empty. In some embodiments, the dropbox autonomous delivery drop point 206 comprises a presence sensor 212 which detects the presence of an item by, for example using a optoelectric sensor, a weight sensor, a beam interruption, etc. Other sensors to indicate if an item is present within the storage receptacle 210 are contemplated such as a force sensor or an optical sensor. Each storage receptacle 210 can include a pressure sensor 212. Each drop point within a storage receptacle 210 can include a pressure sensor 212. The pressure sensor 212 can communicate with the proxy sensor 208 that an item is therein.

Upon communication with the autonomous delivery vehicle 100, the dropbox autonomous delivery drop point 206 can designate a storage receptacle 210 for deposit of the item. In some embodiments, the designated storage receptacle 210 is opened. The autonomous delivery vehicle 100 delivers the item at the designated location. The autonomous delivery vehicle 100 can move to another storage receptacle 210 within the dropbox autonomous delivery drop point 206. The autonomous delivery vehicle 100 can move to another autonomous delivery drop point such as another autonomous delivery drop point along a route.

The dropbox autonomous delivery drop point 206 can include several features to enhance security. The dropbox autonomous delivery drop point 206 can include a stake (not shown). The dropbox autonomous delivery drop point 206 can be secured to the ground or other structure with the stake. In some embodiments, multiple storage receptacles 210 are secured with a single stake. The dropbox autonomous delivery drop point 206 can include a door 214. The door 214 can be located on an outward facing side of the storage receptacles 210. Other locations of the door 214 are contemplated. The door 214 can allow retrieval of items. The door 214 can be opened by the user upon entry of a user input, such as by turning a key or entering a passcode into a keypad. The dropbox autonomous delivery drop point 206 can include a privacy wall 216. The privacy wall 216 can separate one or more storage receptacle 210. The privacy wall 216 can separate two or more dropbox autonomous delivery drop point 206. The privacy wall 216 can conceal whether an item is within the dropbox autonomous delivery drop point 206. For instance, if a user opens one storage receptacle 210, then the user will not be able to see into another storage receptacle 210 due to the privacy wall 216. The dropbox autonomous delivery drop point 206 can be located at any location such as on a porch, roof, or balcony. The dropbox autonomous delivery drop point 206 can include additional features such as box top doors (not shown). The box top doors can be located on a top surface of the dropbox autonomous delivery drop point 206. The autonomous delivery vehicle 100 can open or cause the dropbox autonomous delivery drop point 206 to open the box top doors for delivery. The dropbox autonomous delivery drop point 206 can include locks to secure the items within the dropbox autonomous delivery drop point 206.

The dropbox autonomous delivery drop point 206 can include recipient tags. Each storage receptacle 210 can be assigned such as to an owner, an occupant, or a residence. Each storage receptacle 210 can include an identifier that associates the storage receptacle 210 with the corresponding residence, owner or occupant. The autonomous delivery vehicle 100 can detect the identifier in order to deliver items to the correct residence, owner or occupant. In some embodiments, owners or occupants of multiple residences receive items within a single dropbox autonomous delivery drop point 206. The recipient tags can allow the autonomous delivery vehicle 100 to deliver the item to the corresponding storage receptacle 210.

The dropbox autonomous delivery drop point 206 can include several features to retrieve one or more items. The owner can cause the dropbox autonomous delivery drop point 206 to open with a user input, such as a key or keypad to open the door 214. The owner can access the item from the top of the dropbox autonomous delivery drop point 206. The dropbox autonomous delivery drop point 206 can include any feature of any autonomous delivery drop point described herein.

Figure 8:
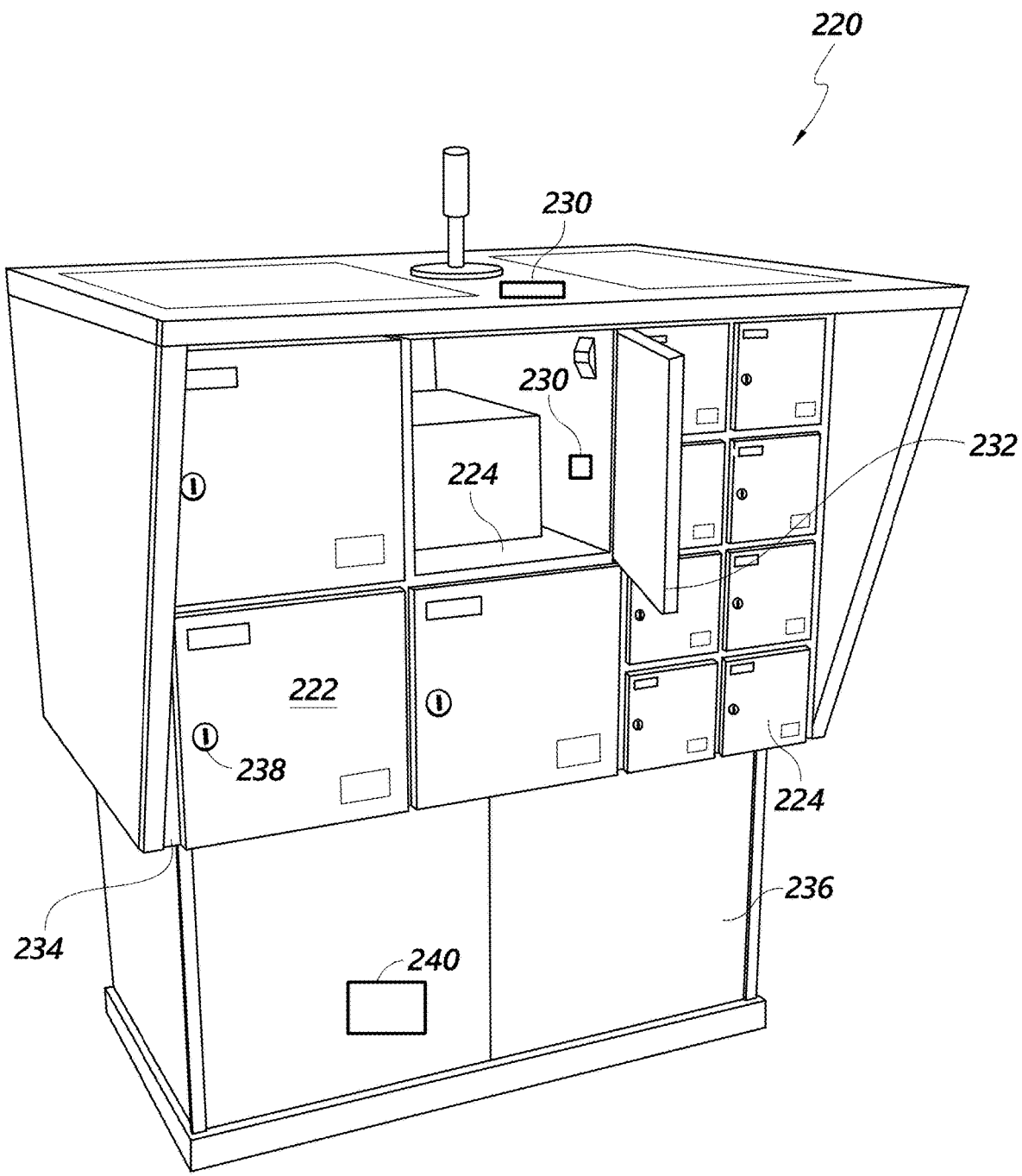
FIG. 8 depicts a perspective view of an embodiment of a clusterbox autonomous delivery drop point.

FIG. 8 depicts a perspective view of a clusterbox autonomous delivery drop point. The clusterbox autonomous delivery drop point 220 can be used for communities or multi-family residence such as an apartment complex, townhouse, duplex, mixed use building, and condominium. The clusterbox autonomous delivery drop point 220 can be designed to accept one or more items at a time. Since all items may not belong to occupants of the same residence, in some embodiments, the clusterbox autonomous delivery drop point 220 can distinguish between recipients. The clusterbox autonomous delivery drop point 220 can include identification of each receptacle by recipient.

The clusterbox autonomous delivery drop point 220 can comprise a clusterbox 222. Multiple items can be stored within the same clusterbox 222. The clusterbox 222 can be pre-existing infrastructure such as the existing mailbox of the multi-family residence. The clusterbox autonomous delivery drop point 220 can be designed to retrofit on a commercially available clusterbox 222. An advantage is that the clusterbox 222 may already be implemented in the multi-family residence.

The clusterbox 222 can comprise multiple storage receptacles 224. Each storage receptacle 224 can store one or more items. In the illustrated embodiment, the clusterbox autonomous delivery drop point 220 comprises eighteen storage receptacles 224 but other configurations are contemplated (e.g., one storage receptacle, two storage receptacles, three storage receptacles, four storage receptacles, five storage receptacles, seven storage receptacles, eight storage receptacles, nine storage receptacles, ten storage receptacles, more than five, more than ten, more than fifteen, etc.). The storage receptacles 224 can be the same size or they can be different sizes. In some embodiments, the owner or occupant of the residence can rent the storage receptacle 224.

Items addressed to multiple residences can be delivered and stored within the clusterbox 222. Each storage receptacle 224 can be associated with a residence within the multi-family residence. For instance, a residence may include multiple residents such as roommates or family members. Each storage receptacle 224 can be assigned to one or more owners or occupants. In some embodiments, multiple occupants of a residence receive items within a single storage receptacle 224. The recipient tags can allow the autonomous delivery vehicle 100 to deliver the item to the corresponding owner's storage receptacle 224. The storage receptacle 224 can be associated with a resident within the multi-family residence.

The clusterbox autonomous delivery drop point 220 can use one or more proxy sensors 230 to create a virtual handshake with the autonomous delivery vehicle 100. In the illustrated embodiment, the delivery vehicle 100 can deliver items to the clusterbox autonomous delivery drop point 220. The clusterbox autonomous delivery drop point 220 can be used for delivery by a carrier such as a human. The clusterbox autonomous delivery drop point 220 can be used for delivery by a robotic arm. The clusterbox autonomous delivery drop point 220 can be used for delivery by a driverless vehicle.

The proxy sensor 230 can be one or more active proxy sensors. The proxy sensor 230 can be one or more passive proxy sensors. The proxy sensor 230 can interact with the target sensor 110 of the autonomous delivery vehicle 100. The proxy sensor 230 can identify the location of clusterbox autonomous delivery drop point 220. The proxy sensor 230 can be embedded within the clusterbox autonomous delivery drop point 220 to communicate with the autonomous delivery vehicle 100. Each storage receptacle 224 can include an embedded proxy sensor 230. The proxy sensor 230 can communicate identifying information about the storage receptacle 224 to the autonomous delivery vehicle 100. The proxy sensor 230 can identify the resident or residence associated with the item receptacle 224. The proxy sensor 230 can have a unique identifier such as a recipient tag. The proxy sensor can by any sensor known in the art capable of performing these functions. The proxy sensor can have an emitter. The proxy sensor can emit an electromagnetic field or a beam of electromagnetic radiation, such as RF or infrared. The proxy sensor can have a detector. The proxy sensor can detect changes in the field or return signal. As described herein, the proxy sensor can be a RFID tag. The proxy sensor can use electromagnetic fields to identify and/or track objects such as autonomous delivery drop point upon which the tag is attached. The tags can contain stored information or instructions, such as on a memory. The passive tags can collect energy from a RFID tag designed to ping or interrogate the passive tag. The active tags can have a local power source.

Each storage receptacle 224 includes a door 232. The door 232 can be located on a side of the storage receptacle 224 as shown in FIG. 8. Upon communication with the autonomous delivery vehicle 100, the clusterbox autonomous delivery drop point 220 can open the storage receptacle 224 for deposit of the item. For instance, the clusterbox autonomous delivery drop point 220 can unlock the door 232 to allow access to the storage receptacle 224. For instance, the clusterbox autonomous delivery drop point 220 pivot a hinge (not shown) associated with the door 232 to allow access to the storage receptacle 224.

The door 232 can be opened by the autonomous delivery vehicle 100 through any means known in art. In some embodiments, each storage receptacle 224 has its own door. A storage receptacle 224 can be opened without having to open one or more other storage receptacles 224 within the clusterbox 222 by opening the door 232 associated with the storage receptacle 224. In other embodiments, two or more storage receptacles 224 are opened via a panel 234. In other embodiments, all storage receptacles 224 are opened via the panel 234. In this embodiment, all storage receptacles 224 are opened during delivery of an item to any storage receptacle 224 within the clusterbox 222. In some embodiments, the doors 232 remain closed when the panel 234 is opened. The panel 234 and door 232 configurations can be similar to commercially available clusterboxes.

Upon communication with the autonomous delivery vehicle 100, the clusterbox autonomous delivery drop point 220 can designate the storage receptacle 224 for deposit of the item. In some embodiments, the designated storage receptacle 224 is opened. The autonomous delivery vehicle 100 delivers the item at the designated location. The autonomous delivery vehicle 100 can move to another storage receptacle 224 within the clusterbox autonomous delivery drop point 220. Upon delivery of one or more items, one or more doors 232 or the panel 234 can be closed.

In some embodiments, the autonomous delivery vehicle 100 can perform a virtual handshake with the proxy sensor 230. The autonomous delivery vehicle 100 can communicate the intended recipient of the item for delivery, and the proxy sensor 230 can communicate to the autonomous delivery vehicle 100 which of the receptacles 224 corresponds to the intended recipient, and the autonomous delivery vehicle 100 will deposit the item into the correct receptacle 234.

The clusterbox autonomous delivery drop point 220 can include several features to enhance security. The clusterbox autonomous delivery drop point 220 can include a stake 236 which can be coupled to the plurality of storage receptacle 224. The clusterbox autonomous delivery drop point 220 can be embedded in the ground or is secured to another structure to secure the clusterbox autonomous delivery drop point 220. In some embodiments, the clusterbox autonomous delivery drop point 220 can be secured with the single stake 236. The clusterbox autonomous delivery drop point 220 can include a security feature such as a lock 238. The autonomous delivery vehicle 100 can open or cause the clusterbox autonomous delivery drop point 220 to open the lock 238 for delivery. The lock 238 is connected to a receiving latch on the door 232 such that when the door is closed the lock connects tot h latch to keep the door 232 close and thus to secure one or more items within the clusterbox autonomous delivery drop point 220.

The clusterbox autonomous delivery drop point 220 can include several features to retrieve one or more items. The owner can cause the storage receptacle 224 to open via the lock 238 on the door 232. The owner can access the item through the open door 232 of the clusterbox autonomous delivery drop point 220. The owner can also be prevented from opening the other storage receptacles 224 of the clusterbox autonomous delivery drop point 220. For instance, the clusterbox autonomous delivery drop point 220 can allow entry only to the storage receptacle 224 associated with the owner or occupant.

The clusterbox autonomous delivery drop point 220 can include additional features. The clusterbox autonomous delivery drop point 220 can include a charging station 240. The charging station 240 can allow the autonomous delivery vehicle 100 to charge via an electrical connection or via a wireless or inductive charging mechanism. The clusterbox autonomous delivery drop point 220 can include any feature of any autonomous delivery drop point described herein.

Figure 9:
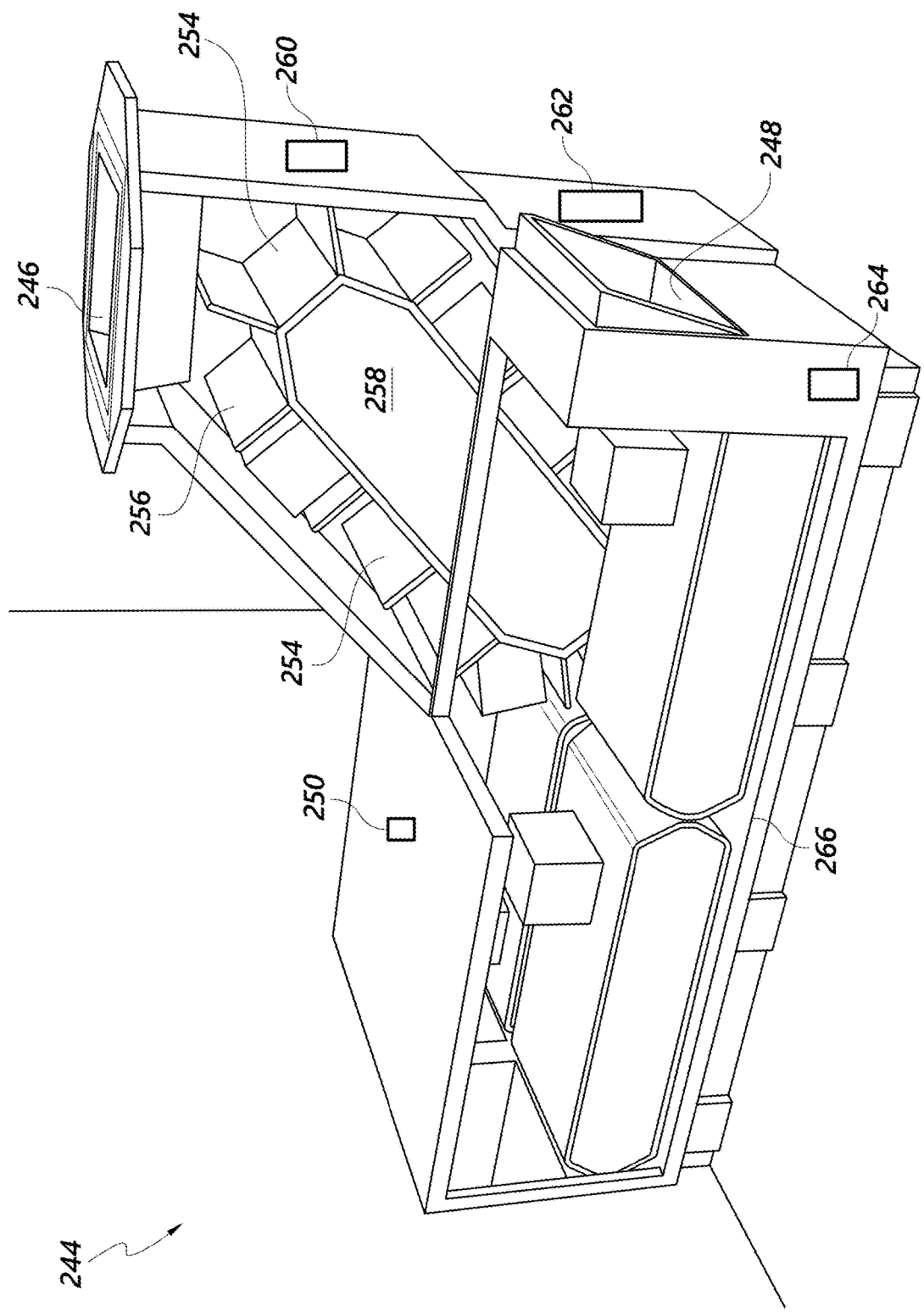
FIG. 9 depicts a perspective view of an embodiment of a vertical autonomous delivery drop point.

FIG. 9 depicts a perspective view of an exemplary vertical autonomous delivery drop point 244. The vertical autonomous delivery drop point 244 can be used for a multi-family residence such as an apartment community. The vertical autonomous delivery drop point 244 can be designed to accept one or more items at a time. Since all items may not be intended for delivery to people living in the same residence, in some embodiments, the vertical autonomous delivery drop point 244 can distinguish between recipients. In some embodiments, the vertical autonomous delivery drop point 244 does not distinguish between recipients in a multi-family residence or group of residences.

The vertical autonomous delivery drop point 244 is useable for high volume deliveries, such as in a multi-dwelling building, an apartment building, a hotel, resort, condominium complex, and the like. The vertical autonomous delivery drop point 244 is configured for aerial deliveries. The autonomous delivery vehicle 100, such as an aerial autonomous delivery vehicle, can deliver items 10 to the vertical autonomous delivery drop point 244. The vertical autonomous delivery drop point 244 includes an aerial port 246. The vertical autonomous delivery drop point 244 is also configured for ground-based deliveries. The autonomous delivery vehicle 100 can be a driverless vehicle. The vertical autonomous delivery drop point 244 includes a ground port 248. The ground port 248 is an opening located on a side surface of the vertical autonomous delivery drop point 244 as shown in FIG. 9. The ground port 248 is an opening through which items can be delivered. The aerial port 246 and the ground port 248 can be delivery inlets.

The vertical autonomous delivery drop point 244 uses one or more proxy sensors 250 to create a virtual handshake with the one or more autonomous delivery vehicles 100, as described herein. The proxy sensor 250 can identify the location of vertical autonomous delivery drop point 244 such as providing information to the autonomous delivery vehicle 100. The proxy sensor 250 can be embedded within the vertical autonomous delivery drop point 244 to communicate with the autonomous delivery vehicle 100. The proxy sensor 250 can interact with the target sensor 110 of the autonomous delivery vehicle 100, such as by emitting information to the autonomous delivery vehicle 100 and/or detecting information from the autonomous delivery vehicle 100. The proxy sensor 250 can cause the aerial port 246 to open, such as by communicating a signal to a device that controls a door of the aerial port 246. The autonomous delivery vehicle 100 can deliver one or more items through the aerial port 246. The proxy sensor 250 can cause the ground port 248 to open, such as by communicating a signal to a device that controls a door of the ground port 248. The autonomous delivery vehicle 100 can deliver one or more items through the ground port. The handshake can determine whether to open the aerial port 246 or the ground port 248. The aerial port 246 and the ground port 248 can each include a door (not shown) which can be opened. For instance, the vertical autonomous delivery drop point 244 includes a processor which controls the opening and/or closing of the doors based on instructions received by the proxy sensor 250. The processor can control a gear, motor, belt or other mechanical mechanism to open or close the doors. In other embodiments, the aerial port 246 and/or the ground port 248 do not include a door and remain open for deliveries.

The vertical autonomous delivery drop point 244 can comprise multiple storage receptacles 254. In the illustrated embodiment, the vertical autonomous delivery drop point 244 comprises eight storage receptacles 254 but other configurations are contemplated (e.g., one storage receptacle, two storage receptacles, three storage receptacles, four storage receptacles, five storage receptacles, seven storage receptacles, eight storage receptacles, nine storage receptacles, ten storage receptacles, more than five, more than ten, more than fifteen, etc.). Each storage receptacle 254 can include a platform 256. The platform 256 extends from a side surface of the storage receptacle 254 as shown in FIG. 9. The platform 256 is used for item placement such that the item 10 rests against the platform 256. The item can be moved by the platform 256 around the central axis. The multiple storage receptacles 254 can surround a central compartment 258. The central compartment 258 can function as the brain of the vertical autonomous delivery drop point 244 by controlling the movement of the multiple storage receptacles 254 as well as performing other functions. The central compartment 258 can include a gear rotate the storage receptacles 254. The movement device can be connected to the central compartment 258 and the storage receptacles 254. For instance, the interior facing sides of the storage receptacles 254 or platform 256 can have corresponding gears to engage the gear of the central compartment 258. In some embodiments, the central compartment 258 can include a belt and the storage receptacles 254 or platform 256 can include a corresponding grip or other feature to engage the belt. In some embodiments, the central compartment 258 can include a rack and the storage receptacles 254 or platform 256 can include a corresponding pinion or other feature to engage the rack.

The vertical autonomous delivery drop point 244 can include several features to rotate the items. The vertical autonomous delivery drop point 244 allows the storage receptacles 254 to be rotated around the central compartment 258 toward or away from the position accessible by the autonomous delivery vehicle 100, such as the position accessible by the aerial port 246 or the ground port 248. The vertical autonomous delivery drop point 244 can rotate at a particular time. The vertical autonomous delivery drop point 244 can empty all items within the storage receptacles 254 at once or nearly at once.

The central compartment 258 can include one or more proxy sensors 250. The proxy sensor 250 can be an active proxy sensor. The central compartment 258 can include the central processing unit to control the functions of the vertical autonomous delivery drop point 244 including acceptance of items, rotation of items, and delivery of items to the designated location. In some embodiments, the vertical autonomous delivery drop point 244 can allow for aerial deliveries. Once the proxy sensor 250 detects the autonomous delivery vehicle 100, the proxy sensor 250 can open the aerial port 246. The central processing unit of the central compartment 258 can rotate the storage receptacles 254 around the x-axis using the belt. The storage receptacles 254 can be rotated until an empty storage receptacle 254 is accessible by the autonomous delivery vehicle 100. The autonomous delivery vehicle 100 can pass the item through the aerial port 246 and into the empty storage receptacle 254. In some embodiments, the vertical autonomous delivery drop point 244 can allow for ground-based. Once the proxy sensor 250 detects the autonomous delivery vehicle 100, the proxy sensor 250 can open the ground port 248. The central processing unit of the central compartment 258 can rotate the storage receptacles 254 around the x-axis using the belt. The storage receptacles 254 can be rotated until an empty storage receptacle 254 is accessible by the autonomous delivery vehicle 100. The autonomous delivery vehicle 100 can pass the item through the ground port 248 and into the empty storage receptacle 254. The vertical autonomous delivery drop point 244 can allow independent delivery through the aerial port 246 and the ground port 248. The vertical autonomous delivery drop point 244 can allow simultaneous delivery through the aerial port 246 and the ground port 248.

The vertical autonomous delivery drop point 244 can include a storage port 260. As the item is rotated toward the storage port 260, the platform 256 can guide the item into the storage port 260. For instance, the item can act under the influence of gravity to slide toward the storage port 260. The platform 256 can be shaped to guide the movement of the item as the item is rotated toward the storage port 260. The storage port 260 can be a chute. The storage port 260 can deliver the item from the storage receptacle 254 to a storage container 262. The storage container 262 can be a secured area. The storage container 262 can be opened with a user interface such as a key or keypad. The storage container 262 can be associated with the multi-family residence. The storage container 262 can be a large storage location that can store items for more than one residence, for instance the storage container 262 can be a large bin. The storage container 262 can be located in the mailroom of the multi-family residence. The storage container 262 allows for retrieval of the items by owners, occupants, or staff of the residence. The items can also be sorted by owners, occupants, or staff of the residence. The vertical autonomous delivery drop point 244 can allow simultaneous delivery to the mailroom or other location of the multi-family residence. In some embodiments, the vertical autonomous delivery drop point 244 can be configured for a variety of use cases or infrastructures, such as a condominium complex, an apartment complex, a centralized mail facility, a mailroom at a commercial or residential facility, and the like. To conform the vertical autonomous delivery drop point 244 to a specific installation can use a plurality of belts, chutes, or other passage ways to transport the item 10 from the aerial port 246 and/or the ground port 248 to the storage port 260 and storage container 262, where the item can be collected by a user. For instance, the vertical autonomous delivery drop point 244 can allow delivery of two or more items through two or more storage ports 260.

The vertical autonomous delivery drop point 244 can include additional features. The vertical autonomous delivery drop point 244 can include a charging station 264. The charging station 264 can allow the autonomous delivery vehicle 100 to charge. The vertical autonomous delivery drop point 244 can include one or more features to reduce the accumulation of debris within the vertical autonomous delivery drop point 244. The vertical autonomous delivery drop point 244 can include a perforated bottom 266. The perforated bottom 266 can comprise small holes to allow debris such as rainwater or other liquid, leaves, acorns, trash or other particulate to empty from the vertical autonomous delivery drop point 244. An advantage is that the vertical autonomous delivery drop point 244 can allow for a high volume of item delivery. An advantage is that the vertical autonomous delivery drop point 244 can have a small footprint. Another advantage is that the vertical autonomous delivery drop point 244 can have a small footprint. The vertical autonomous delivery drop point 244 can include any feature of any autonomous delivery drop point described herein.

Figure 10:
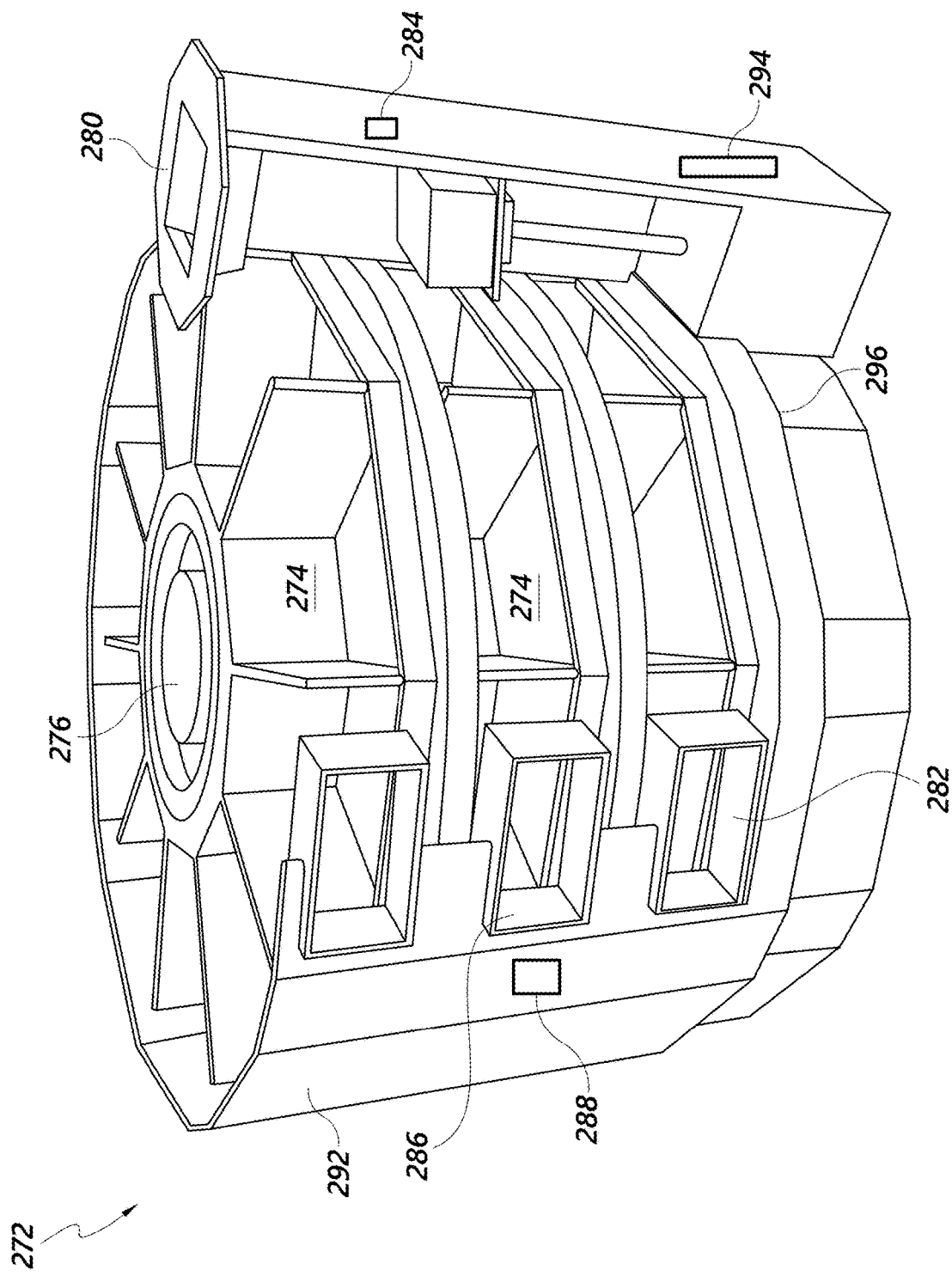
FIG. 10 depicts a perspective view of an embodiment of a waterwheel autonomous delivery drop point.

FIG. 10 depicts a perspective view of a waterwheel autonomous delivery drop point 272 with a portion of the protective casing 292 removed to expose exemplary portions of the interior to view. The waterwheel autonomous delivery drop point 272 can be used for a multi-family residence such as an apartment community or commercial building. The waterwheel autonomous delivery drop point 272 can be designed to accept one or more items at a time. Since all items may not be addressed to members of the same residence, in some embodiments, the waterwheel autonomous delivery drop point 272 can distinguish between recipients.

The waterwheel autonomous delivery drop point 272 can comprise multiple storage receptacles 274. In the illustrated embodiment, the waterwheel autonomous delivery drop point 272 comprises ten or more storage receptacles 274 but other configurations are contemplated (e.g., one storage receptacle, two storage receptacles, three storage receptacles, four storage receptacles, five storage receptacles, seven storage receptacles, eight storage receptacles, nine storage receptacles, ten storage receptacles, more than five, more than ten, more than fifteen, etc.).

Each storage receptacle 274 can be associated with a single residence within the multi-family residence. Each owner, occupant, or residence can have their own storage receptacle 274. Each storage receptacle 274 can be assigned to a specific resident. Each storage receptacle 274 can be assigned to a specific residence. The storage receptacle 274 can be sized to accept one or more items. The storage receptacle 274 can be sized to accept all items for a residence. Each storage receptacle 274 can be secured by an elastic band which can function to secure the items in place. In some embodiments, the elastic band can be stretched such that the elastic band applied a pressure to the item. The elastic band can secure the items within the storage receptacle 274 by applying such pressure to reduce the movement of the items as the waterwheel autonomous delivery drop point 272 rotates. In some embodiments, the storage receptacle 274 can be adjustable to change at least one dimension of the storage receptacle 274, such as by increasing the volume of the receptacle 274.

The storage receptacles 274 can surround and be connected along their inner surfaces to a central compartment 276. The central compartment 276 can function as the brain of the waterwheel autonomous delivery drop point 272 by controlling the movement of the multiple storage receptacles 274 as well as performing other functions.

The waterwheel autonomous delivery drop point 272 can be used for high volume deliveries. The waterwheel autonomous delivery drop point 272 can be designed for aerial deliveries. The autonomous delivery vehicle 100 can be an aerial autonomous delivery vehicle. The waterwheel autonomous delivery drop point 272 can include an aerial port 280. The waterwheel autonomous delivery drop point 272 can be designed for ground-based deliveries. The autonomous delivery vehicle 100 can be a driverless vehicle. The waterwheel autonomous delivery drop point 272 can include a ground port 282. The aerial port 280 and the ground port 282 can be delivery inlets.

The waterwheel autonomous delivery drop point 272 uses one or more proxy sensors 284 to create a virtual handshake with the autonomous delivery vehicle 100. The waterwheel autonomous delivery drop point 272 can identify the locations of the autonomous delivery drop point. The proxy sensor 284 can interact with the target sensor 110 of the autonomous delivery vehicle 100. The proxy sensors 284 can be located anywhere on the waterwheel autonomous delivery drop point 272. The delivery of an item can be coordinated by information provided by the autonomous delivery vehicle 100. The virtual handshake alerts the waterwheel autonomous delivery drop point 272 that the autonomous delivery vehicle 100 is there. The autonomous delivery drop point 272 prepares for delivery, for instance by opening any doors associated with the ports. The autonomous delivery vehicle 100 delivers the item into an open location. The autonomous delivery vehicle 100 can communicate that delivery has occurred. The autonomous delivery drop point 272 prepares for storage, for instance by closing any doors associated with the ports and/or rotating the item.

The proxy sensor 284 can cause the aerial port 280 to open. The autonomous delivery vehicle 100 can deliver one or more items through the aerial port 280. The proxy sensor 284 can cause the ground port 282 to open. The autonomous delivery vehicle 100 can deliver one or more items through the ground port 282. The handshake can determine whether to open the aerial port 280 or the ground port 282. The aerial port 280 and the ground port 282 can each include a door which can be opened. Once the proxy sensor 250 detects the autonomous delivery vehicle 100, the aerial port 280 or the ground port 282 will be opened. The handshake can identify the owner of the item. The handshake can communicate the residence of the owner of the item. The handshake can communicate to the waterwheel autonomous delivery drop point 272 how to rotate the waterwheel autonomous delivery drop point 272 to allow for delivery of the item, for instance by rotating an empty storage receptacle 274 to the delivery port. In some embodiments, the storage receptacle 274 can rotate in either direction (e.g., clockwise or counterclockwise). The handshake can communicate to make the storage receptacle 274 corresponding to the owner of the item accessible to the autonomous delivery vehicle 100. The handshake can set in motion the processes needed to deliver the item to the appropriate storage receptacle 274.

The waterwheel autonomous delivery drop point 272 can include several features to receive and store one or more items. The central compartment 276 can include a gear or other movement device to rotate the storage receptacles 274. The interior facing sides of the storage receptacles 274 can have corresponding gears, grips, or other features to engage the gear or other movement device. The waterwheel autonomous delivery drop point 272 can allow the storage receptacles 274 to be rotated toward or away from the position accessible by the autonomous delivery vehicle 100.

The central processing unit of the central compartment 276 can rotate the storage receptacles 274 around the x-axis using the gear. The storage receptacles 274 can be rotated until a storage receptacle 274 corresponding to the owner of the item is accessible by the autonomous delivery vehicle 100. The waterwheel autonomous delivery drop point 272 can rotate the storage receptacles 274 to put the corresponding storage receptacle 274 near the port 280, 282. The autonomous delivery vehicle 100 can pass the item through the port 280, 282 and into the empty storage receptacle 140. The waterwheel autonomous delivery drop point 272 will rotate the storage receptacles 274 about the x axis. The waterwheel autonomous delivery drop point 272 can rotate to provide another storage receptacle 274 to the autonomous delivery vehicle 100 for the delivery of an item. The autonomous delivery vehicle 100 can leave several deliveries to a single storage receptacle 274 before the items are retrieved by the owner of the items.

The waterwheel autonomous delivery drop point 272 can include several features to retrieve one or more items. The waterwheel autonomous delivery drop point 272 can include a door 286. The door 286 can be located at a position distinct from the aerial port 280 and the ground port 282. The owner can retrieve one or more items through the door 286. The waterwheel autonomous delivery drop point 272 can include a keypad 288 which allows the owner of the item to retrieve the item. The keypad 288 can allow the owner to access the storage receptacle 274 associated with the owner. The waterwheel autonomous delivery drop point 272 can identify any storage receptacle 274 via the keypad 288 or other input device. When a recipient is notified he has an item in the waterwheel autonomous delivery drop point 272, the recipient can receive a code or identifier which the recipient can enter into a keypad or other similar device. When the code or identifier is input, the internal mechanism of the waterwheel autonomous delivery drop point 272 can move the receptacles 274 until the receptacle having the item for the recipient is positioned behind the door 286 which the recipient is accessing. The keypad 288 can allow the user to access the waterwheel autonomous delivery drop point 272 by disengaging the lock on the door 286. In some embodiments, before allowing access via the door 286, the waterwheel autonomous delivery drop point 272 can rotate the storage receptacles 274 such that the storage receptacle 274 with the item is accessible via the door 286. In other embodiments, the waterwheel autonomous delivery drop point 272 can rotate after the owner unlocks the door 286. The waterwheel autonomous delivery drop point 272 can rotate such that another storage receptacle 274 is not available to the owner.

The waterwheel autonomous delivery drop point 272 can include several features to enhance security. In some embodiments, the door 286 can include magnetic locks that will attach to magnets on the adjacent wall while the autonomous delivery vehicle 100 is detected. The waterwheel autonomous delivery drop point 272 can include a protective casing 292. The protective casing 292 can protect the contents such as items, storage receptacles 274, and the central compartment 276. The protective casing 292 can protect from weather and light damage. If the protective casing 292 is breached, an alarm can be triggered. The central compartment 276 can include one or more proxy sensors 284. The central compartment 276 can include the alarm. The central compartment 276 can include the central processing unit to control the functions of the waterwheel autonomous delivery drop point 272 including acceptance of items, rotation of items, and delivery of items to the owner.

The waterwheel autonomous delivery drop point 272 can include additional features. The waterwheel autonomous delivery drop point 272 can include a charging station 294. The charging station 294 can allow the autonomous delivery vehicle 100 to charge. The waterwheel autonomous delivery drop point 272 can include a perforated bottom 296. The perforated bottom 296 can comprise small holes to allow debris such as rainwater or other liquid, leaves, acorns, trash or other particulate to empty from waterwheel autonomous delivery drop point 272. The waterwheel autonomous delivery drop point 272 can include any feature of any autonomous delivery drop point described herein.

The proxy sensor described herein can be considered a target. The autonomous delivery vehicle 100 can emit a signal, scan for computer readable codes, or otherwise interrogate the vehicle's surroundings to identify the target. For example, the autonomous delivery vehicle 100 can emit a LIDAR signal, such as laser light in a field around the autonomous delivery vehicle 100. The autonomous delivery vehicle 100 can sense the reflected LIDAR signals and interpret the reflected signals. The autonomous delivery vehicle 100 can recognize a reflected LIDAR signals and identify any known reflection patterns or signals to determine whether a proxy sensor has been detected. In some embodiments, the autonomous delivery vehicle 100 can begin to detect the proxy sensor when the autonomous delivery vehicle 100 determines it is at the GPS coordinates of the delivery point. In some embodiments, the autonomous delivery vehicle 100 can send signals continuously, or periodically emit signals. In some embodiments, autonomous delivery vehicle 100 can identify computer readable codes, or use the radar and/or ultrasonic detectors to detect a proxy sensor.

The autonomous delivery vehicle 100 can confirm the identity of the proxy sensor. Confirming the identity of the proxy sensor comprises uniquely identifying the proxy sensor as belonging to a particular delivery point such as an autonomous delivery drop point storage receptacle, owner, residence or the like. In some embodiments, the autonomous delivery vehicle 100 will not deliver an item to a proxy sensor which has an incorrect identifier, or which the identity cannot be confirmed. The autonomous delivery vehicle 100 can store or access a list of identifiers for proxy sensors along a specified delivery route.

In some embodiments, the proxy sensor can have a unique identifier encoded therein or thereon, such that when interrogated by a LIDAR signal from the autonomous delivery vehicle 100, a specific signal is returned. In some embodiments, the proxy sensor is a passive RFID tag which emits a signal when interrogated by a signal from the autonomous delivery vehicle 100. In some embodiments, the proxy sensor is an active RFID tag which emits an identifier signal at regular or programmed intervals, intermittently, in response to a signal from the autonomous delivery vehicle 100, or continuously. In some embodiments, the proxy sensor has a computer readable code thereon, which can be read by the autonomous delivery vehicle 100 and decoded by the autonomous delivery vehicle 100.

In some embodiments, a resident, occupant, individual, business or the like can buy, obtain, install, or provide a storage receptacle having a proxy sensor thereon or attached thereto. The resident or occupant can register the proxy sensor, so that the proxy sensor will be recognizable to the autonomous delivery vehicle 100. The resident or occupant can input the delivery point, such as an address, along with a serial number listed on the proxy sensor, a computer readable code on the proxy sensor, or other input from the proxy sensor into the user input device. This can be done, for example, via a smart phone a mobile application, or a website, such as the USPS's website. The user input device can communicate the information input from the proxy sensor to a server, where it can be stored and associated with the autonomous delivery drop point.

The autonomous delivery vehicle 100 can identify the proxy sensor for a delivery point. To detect the proxy sensor, the autonomous delivery vehicle 100 or a sensor thereon can be activated when the autonomous delivery vehicle 100 arrives at the coordinates of the delivery point. The autonomous delivery vehicle 100 can send out interrogation signals, LIDAR signals, radar signals, and the like. The autonomous delivery vehicle 100 can also receive corresponding signals reflected or initiated by the signals sent from the autonomous delivery vehicle 100. In some embodiments, the ultrasonic sensor, the radar sensor, or the video camera can identify the proxy sensor based on a specific reflected sound or radar signal, or by recognizing a specific pattern, image, or computer readable code on the proxy sensor.

In some embodiments, the autonomous delivery vehicle 100 can use a near field communication, such as a passive or active RFID signal to determine exactly where the autonomous delivery vehicle 100 needs to move to align with the proxy sensor. The autonomous delivery vehicle 100 can send out a signal that is reflected by the proxy sensor, or which is absorbed or received by the proxy sensor and the proxy sensor broadcasts a signal in response, or both. Using the reflected or broadcast signal from the proxy sensor, the autonomous delivery vehicle 100 can determine the distance and direction of the proxy sensor in relation to the autonomous delivery vehicle 100.

In some embodiments, the proxy sensor is an active RFID tag, which sends instructions in response to a signal from the autonomous delivery vehicle 100, or which broadcasts a signal at a certain periodicity, or continuously. The signal from the active RFID proxy sensor can communicate specific instructions to the autonomous delivery vehicle 100. For example, the proxy sensor may not be physically affixed to or attached to the autonomous delivery drop point. The proxy sensor may be on a street sign, a sidewalk, a fence, or other position near the autonomous delivery drop point. In this case, the proxy sensor may tell the autonomous delivery vehicle 100 that the autonomous delivery drop point is, for example, two feet forward from the location of the proxy sensor. The autonomous delivery vehicle 100 can then determine, from this signal, exactly how far to move the autonomous delivery vehicle 100 to align with the storage receptacle, port, door, or other feature autonomous delivery drop point.

In some embodiments, the exact position of the proxy sensor and/or the autonomous delivery drop point can be determined in advance of the autonomous delivery vehicle 100 proceeding on the delivery route. The autonomous delivery vehicle 100 can learn the contours, features, and the exact locations of the autonomous delivery drop point along the delivery route. The autonomous delivery vehicle 100 can create an electronic map or virtual map of the delivery route, including the location of the proxy sensors. The map can identify proxy sensors and identify the distance between the proxy sensors and landmarks, terrain, environmental features, and the like.

The proxy sensors described herein can communicate with any autonomous delivery vehicle 100. The signaling technology is able to communicate with any autonomous delivery vehicle 100 in part due to the standardization of the format and content of the communication. The format and content of the communication can be used universally amongst the autonomous delivery vehicle 100 and the autonomous delivery drop points, described herein. The hardware of the proxy sensor may vary based on the needs of the design. The software of the proxy sensor may vary based on the needs of the design.

The proxy sensor can include the following. The proxy sensor can include signal protocol. The proxy sensor can be receptive to an established set of frequency bands. The proxy sensor can be receptive to the frequency bands in order to accommodate several autonomous delivery vehicles 100. The proxy sensor can include messaging protocol. The proxy sensor can require a standardized syntax for messaging between devices. The format and the content of the messages can include a connection protocol. The format and the content of the messages can include one or more commands. The format and the content of the messages can include a language. The format and the content of the messages can include one or more standard response message codes. The format and the content of the messages can include message encryption and encoding. The format and the content of the messages can include unit identification. The format and the content of the messages can include any additional header. The format and the content of the messages can include the message body. The body data can include a location identification method in order for the autonomous delivery vehicles 100 to calculate the relative distance between the autonomous delivery vehicles 100 and the autonomous delivery drop points. The body data can include instructions on how to perform the hand-off or delivery of the items including whether to drop, push or awaiting the autonomous delivery vehicles 100 to receive the item.

The passive proxy sensor is designed for use with any autonomous delivery vehicle 100. The passive proxy sensor can be used with any autonomous delivery drop point. In some embodiments, the passive proxy sensor does not have an internal power source. In some embodiments, the passive proxy sensor cannot provide dynamic communication with the autonomous delivery vehicle 100. The passive proxy sensor is designed for use with any autonomous delivery drop point that will not have a power source. The passive proxy sensor is designed for use with any autonomous delivery drop point that will not require dynamic communication with the autonomous delivery vehicles 100. The passive sensor can contain information on how the autonomous delivery vehicles 100 should deliver to the passive sensor or the associated autonomous delivery drop point. The passive sensor can include information such as the location of the autonomous delivery drop point, the size of the autonomous delivery drop point or associated storage receptacle, and the owner or residence. The proxy sensor may not be able to provide complex responses.

Figure 11:
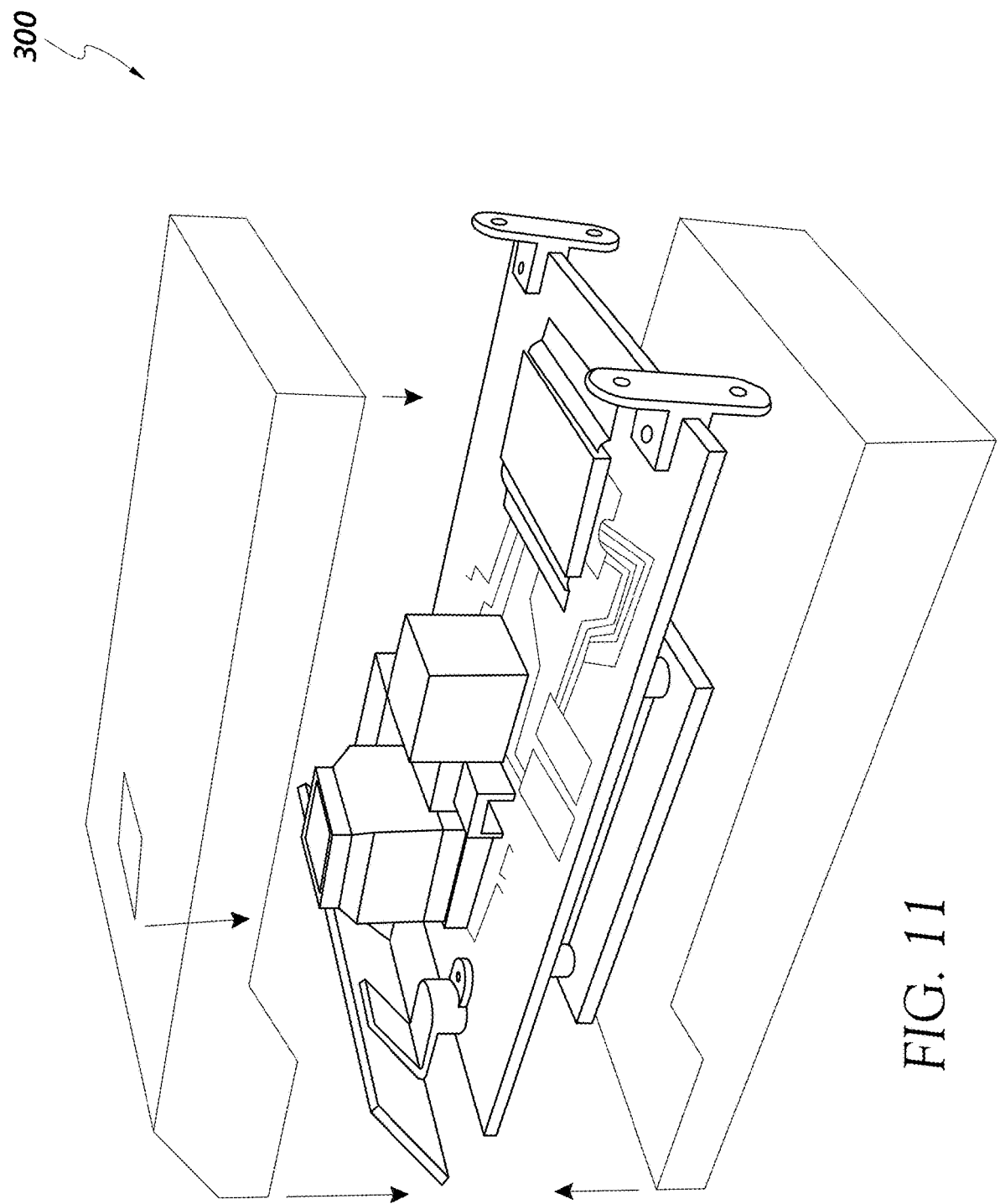
FIG. 11 depicts a perspective view of an embodiment of a passive proxy sensor.

FIG. 11 depicts a passive proxy sensor 300. The passive proxy sensor 300 can include any features of passive proxy sensors or proxy sensors described herein. The passive proxy sensor 300 can be used with any autonomous delivery drop point described herein. The passive proxy sensor 300 can be easy to maintain. The passive proxy sensor 300 can be more robust than other types of sensors. The passive proxy sensor 300 can have limited capability. The passive proxy sensor 300 is designed for any autonomous delivery drop points described herein.

The passive proxy sensor 300 can include any shape known in the art. The passive proxy sensor 300 can have a small size. The passive proxy sensor 300 can be less than one square inch. The passive proxy sensor 300 can have a cross-sectional dimension less than an inch. The passive proxy sensor 300 can be square or rectangular in cross-sectional. Other shapes are contemplated. The passive proxy sensor 300 can include no internal power source.

The passive proxy sensor 300 can include information stored passively. The passive proxy sensor 300 may not require batteries. Instead, the passive proxy sensor 300 can be charged or activated by the autonomous delivery vehicle 100. The passive proxy sensor 300 can be charged by the autonomous delivery drop point.

The passive proxy sensor 300 can include any features to improve longevity. The passive proxy sensor 300 can include a robust exterior. The passive proxy sensor 300 can be impact resistant. The passive proxy sensor 300 can be waterproof. The passive proxy sensor 300 can be temperature resistant such as resistant to hot or cold temperatures. The passive proxy sensor 300 can be resistant to electrical failures.

The passive proxy sensor 300 can include geospatial information. The geospatial information can be specific to the location of the passive proxy sensor 300. The passive proxy sensor 300 can have customized geospatial information. The passive proxy sensor 300 can have its geospatial information customizable for the autonomous delivery drop point. The passive proxy sensor 300 can have its geospatial information customizable for each autonomous delivery drop point that the passive proxy sensor 300 is implemented in.

The passive proxy sensor 300 can be embedded within the autonomous delivery drop point. The passive proxy sensor 300 can include a RFID tag. The passive proxy sensor 300 can store information related to the identification of the passive proxy sensor 300. The delivery can be coordinated relative to the passive proxy sensor 300. The delivery point can be spaced apart or elsewhere from the passive proxy sensor 300. The passive proxy sensor 300 can provide information of exactly where to deliver one or more items. The passive proxy sensor 300 need not be at the autonomous delivery drop point. The passive proxy sensor 300 need not be at the storage receptacle.

The autonomous delivery vehicle 100 can travel along the route toward the autonomous delivery drop point. The autonomous delivery vehicle 100 can ping the passive proxy sensor 300. In some embodiments, the autonomous delivery vehicle 100 can ping the RFID tag of the passive proxy sensor 300. The autonomous delivery vehicle 100 can receive information from the passive proxy sensor 300. The autonomous delivery vehicle 100 can receive instructions on where to drop or deliver the item.

Figure 12:
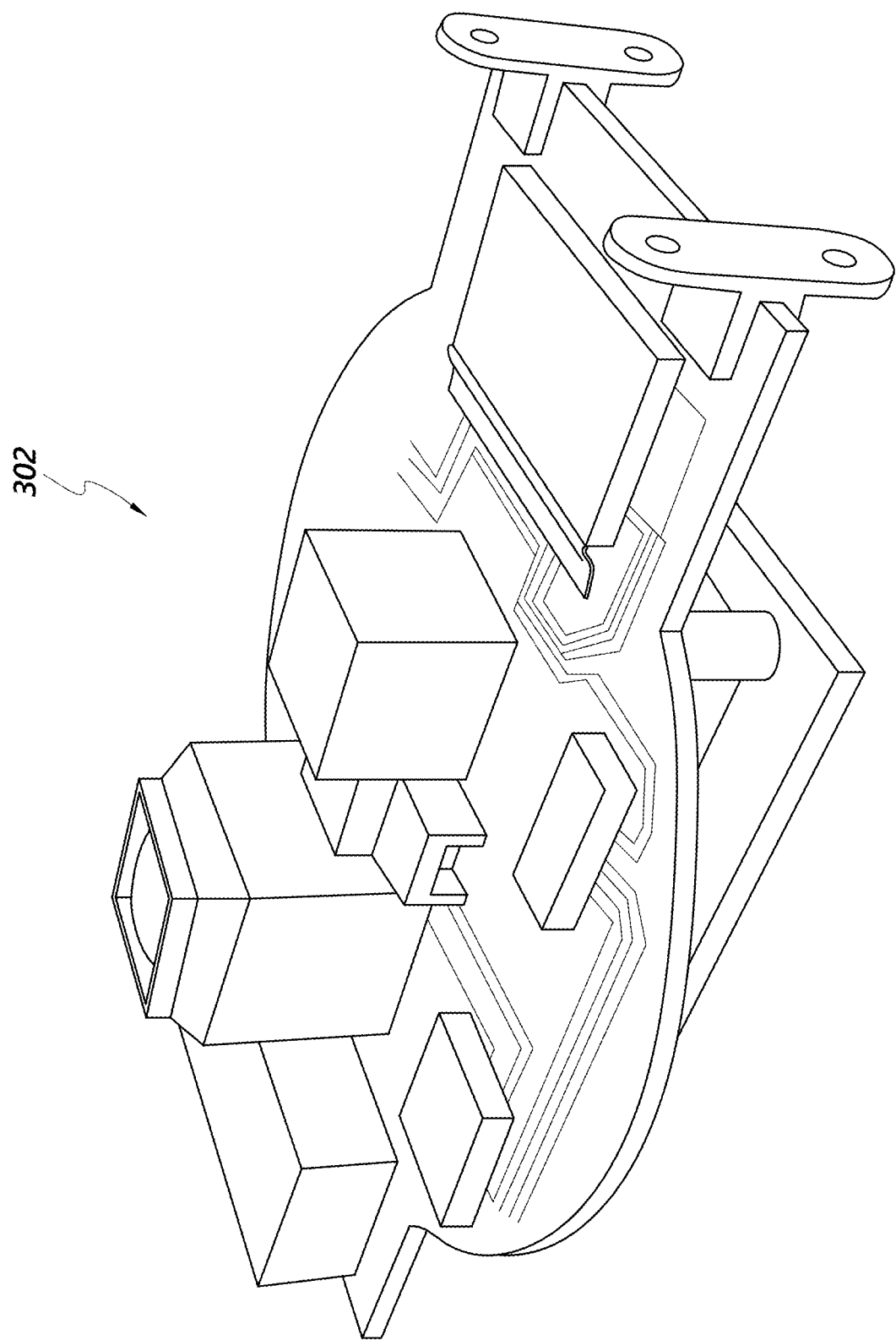
FIG. 12 depicts a perspective view of an embodiment of an active proxy sensor.

FIG. 12 depicts an active proxy sensor 302. The active proxy sensor 302 can include any features of active proxy sensors or proxy sensors described herein. The active proxy sensor 302 can be used with any autonomous delivery drop point described herein. The active proxy sensor 302 can be easy to maintain. The active proxy sensor 302 can be more robust than other types of sensors. The active proxy sensor 302 can have more capabilities than the passive proxy sensor 300. The active proxy sensor 302 is designed for any autonomous delivery drop points described herein. The active proxy sensor 302 can include software and hardware to generate information. The active proxy sensor 302 can generate information regarding how each autonomous delivery vehicle 100 should deliver to a specific autonomous delivery drop point. The active proxy sensor 302 can authenticate the autonomous delivery vehicle 100. The active proxy sensor 302 can open doors, close doors, open ports, close ports and other functions described herein. The active proxy sensor 302 can identify the storage receptacle. The active proxy sensor 302 can identify the autonomous delivery drop point. The active proxy sensor 302 can identify the autonomous delivery drop point or storage receptacle for delivery. The active proxy sensor 302 can determine whether the autonomous delivery drop point or storage receptacle is full or occupied and therefore unable to receive additional deliveries at that time.

The active proxy sensor 302 can include any shape known in the art. The active proxy sensor 302 can have a small size. The active proxy sensor 302 can be less than one square inch. The active proxy sensor 302 can have a cross-sectional dimension less than an inch. The active proxy sensor 302 can be circle or oval in cross-sectional. Other shapes are contemplated.

In some embodiments, the active proxy sensor 302 can include a power source. In some embodiments, the active proxy sensor 302 can include batteries. The active proxy sensor 302 can include information stored actively. The active proxy sensor 302 can require batteries. The active proxy sensor 302 can be charged or activated by the autonomous delivery vehicles 100. The active proxy sensor 302 can be charged by the autonomous delivery drop point. The active proxy sensor 302 can be charged by a power source. The active proxy sensor 302 can be designed for use with any autonomous delivery drop point that has a power source. The active proxy sensor 302 can be designed for use with any autonomous delivery drop point and can dynamically communicate with the autonomous delivery vehicle 100.

The active proxy sensor 302 can include any features to improve longevity. The active proxy sensor 302 can include a robust exterior. The active proxy sensor 302 can be impact resistant. The active proxy sensor 302 can be waterproof. The active proxy sensor 302 can be temperature resistant such as resistant to hot or cold temperatures. The active proxy sensor 302 can be resistant to electrical failures.

The active proxy sensor 302 can include geospatial information. The geospatial information can be specific to the location of the active proxy sensor 302. The active proxy sensor 302 can have customized geospatial information. The active proxy sensor 302 can have its geospatial information customizable for the autonomous delivery drop point. The active proxy sensor 302 can have its geospatial information customizable for each autonomous delivery drop point that the active proxy sensor 302 associated therewith.

The active proxy sensor 302 can be embedded within the autonomous delivery drop point. The active proxy sensor 302 can include a RFID tag. The active proxy sensor 302 can store information related to the identification of the active proxy sensor 302. The delivery can be coordinated relative to the active proxy sensor 302. The delivery point can be spaced apart or elsewhere from the active proxy sensor 302. The active proxy sensor 302 can provide information of exactly where to deliver. The active proxy sensor 302 need not be at the autonomous delivery drop point. The active proxy sensor 302 need not be at the storage receptacle.

The active proxy sensor 302 can provide the same functionality of the passive sensor 300. The active proxy sensor 302 can provide additional functionality than the passive sensor 300. The active proxy sensor 302 can instruct the function of mechanical components such as opening doors or ports. The active proxy sensor 302 can provide a bi-directional handshake. The active proxy sensor 302 can receive information from the autonomous delivery vehicle 100. The active proxy sensor 302 can send information to the autonomous delivery vehicle 100. The handshake can validate that the autonomous delivery vehicle 100 is associated with a carrier, such as the USPS.

The handshake can serve as delivery confirmation. The handshake can provide information that a specific item was delivered. The handshake can provide information that a specific item was delivered by specific autonomous delivery vehicle 100. The handshake can provide information that a specific item was delivered to a specific address. The handshake can provide information regarding the time of delivery. The handshake can provide information regarding the location of delivery. The handshake can verify the receipt of the item. The handshake can verify the relationship between the autonomous delivery vehicle 100 and the receptacle. The relationship can be stored on a database and can be verified via a wireless connection from the autonomous delivery vehicle 100 and the database. The handshake can provide a signature of the RFID of the active proxy sensor 302. The handshake can confirm to the autonomous delivery vehicle 100 that the autonomous delivery vehicle is at the correct item receptacle for the delivery point on the item to be delivered, and/or that the receptacle is associated with the distribution network to which the autonomous delivery vehicle belongs.

Figure 13:
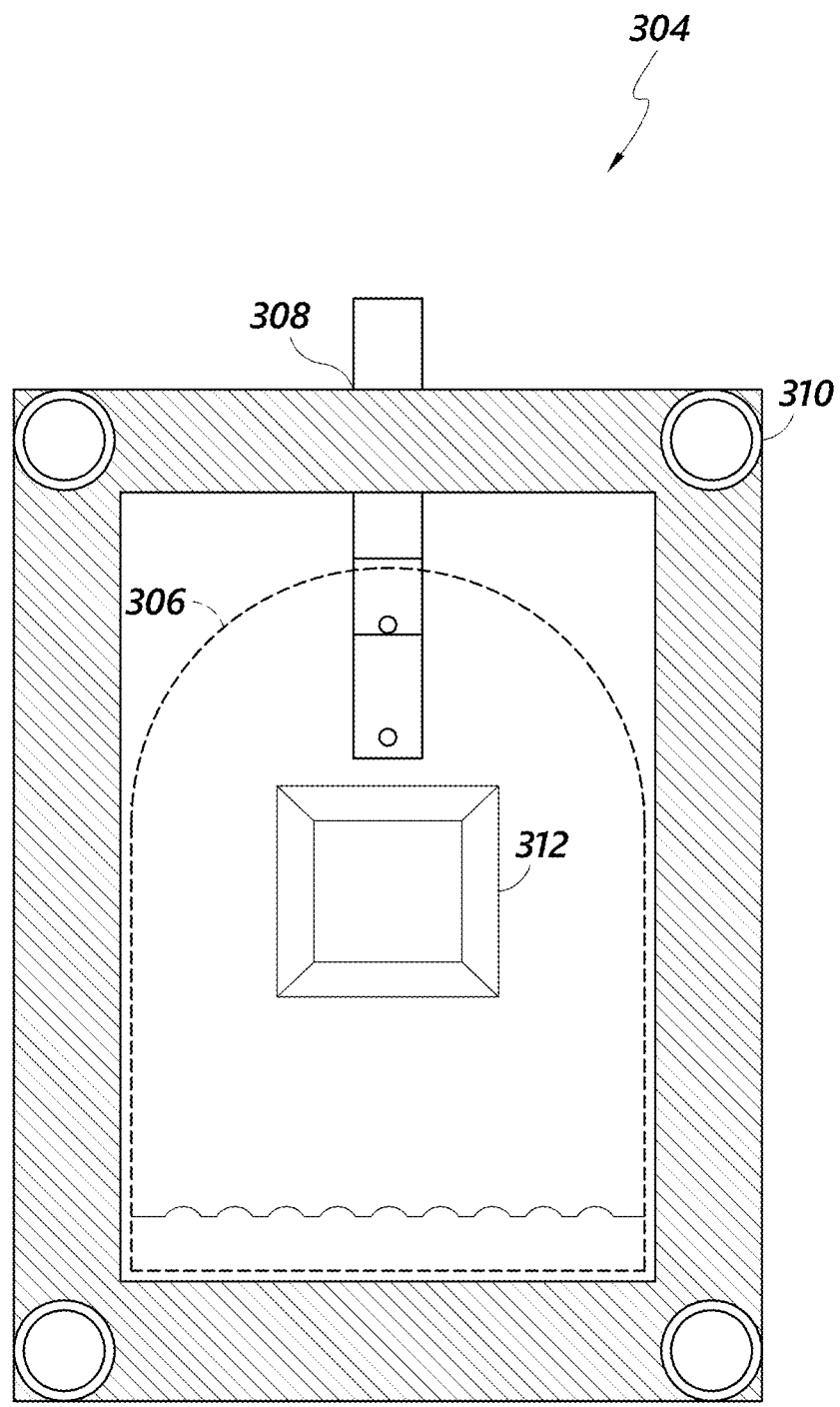
FIG. 13 depicts a front elevation view of an embodiment of a vehicle arm connection configuration.

FIG. 13 depicts a vehicle arm connection configuration 304. The vehicle arm connection configuration 304 can relate to the way sensors are positioned around an opening 306. The opening 306 can be a mailbox opening. The opening 306 can be a door, as described herein. The opening 306 can be a port, such as an aerial or ground port. The opening 306 can be based on specification provided by a carrier, such as the USPS.

The vehicle arm connection configuration 304 can provide a way for the autonomous delivery vehicle 100 to affix to the autonomous delivery drop point. The autonomous delivery vehicle 100 can include a delivery arm (not shown). The delivery arm can extend toward the opening 306 to deliver the item. The vehicle arm connection configuration 304 can provide a way for the delivery arm to affix to the autonomous delivery drop point.

The vehicle arm connection configuration 304 can include a configuration of one or more sensors. In some embodiments, one of several configurations of sensors is implemented. The configuration of the sensors can be determined based on the autonomous delivery vehicle 100. The configuration of the sensors can be determined based on the method of delivery of the autonomous delivery vehicle 100. The configuration of the sensors can be determined based on delivery arm design of the autonomous delivery vehicle 100. The configuration of the sensors can be determined based on the autonomous delivery drop point.

The vehicle arm connection configuration 304 can be used with any autonomous delivery vehicle 100. The vehicle arm connection configuration 304 can be used with ground-based autonomous delivery vehicles 100.

The vehicle arm connection configuration 304 can include a visual guidance strip 308. The visual guidance strip 308 can be uniquely patterned. The visual guidance strip 308 can be a tape. The visual guidance strip 308 can allow the autonomous delivery vehicle 100 to visually see the target such as an autonomous delivery drop point. The visual guidance strip 308 can allow the autonomous delivery vehicle 100 to see the target for a grappling connection. The visual guidance strip 308 can allow the autonomous delivery vehicle 100 to locate the opening 306.

The vehicle arm connection configuration 304 can include one or more measurement guidance points 310. The guidance point 310 can be unique. The guidance point 310 can be uniquely patterned. The guidance point 310 can include a color pattern. The guidance point 310 can include infrared or other reflective properties. The guidance point 310 can include non-visual spectral point. The guidance point 310 can include a proxy sensor. The guidance point 310 can include an embedded RFID chip. The guidance point 310 can be magnetic. The guidance point 310 include one or more magnets for latching.

The guidance points 310 can be placed on or near the corners of a target such as a storage receptacle or autonomous delivery drop point. The guidance points 310 can provide measurement and connection points for the autonomous delivery vehicle 100. The guidance points 310 can provide measurement and connection points between the autonomous delivery vehicle 100 and the target such as a storage receptacle or autonomous delivery drop point.

The vehicle arm connection configuration 304 can include a central identification chip 312. The central identification chip 312 can be weather protected such as through a protective casing. The central identification chip 312 can be affixed to the exterior of a target such as a storage receptacle or autonomous delivery drop point. The central identification chip 312 can provide information to the autonomous delivery vehicle 100. The information can include information in a propriety format. Examples of information include one or more dimensions of the storage receptacle, one or more dimensions of the autonomous delivery drop point, location, and residence information such as owner identification or owner name. The central identification chip 312 can be designed to connect with other features such as a lock, alarm, or sensor including proxy sensor and pressure sensor. The central identification chip 312 can be designed to provide security. The central identification chip 312 is used to signal to the autonomous delivery vehicle 100 where the center or other selected position of the storage receptacle is located in order to align the autonomous vehicle in the proper position for delivering an item. The central identification chip 312 can also contain an identifier unique to the receptacle in order to allow the autonomous delivery vehicle 100 to identify and differentiate receptacles. In some embodiments, the central identification chip 312 stores a record of access at the receptacle and can infer whether an item is present in the receptacle. for example, the central identification chip 312 can record an event upon delivery of an item from the autonomous delivery vehicle 100, and can store an event when the receptacle is opened by a user. The central identification chip 312 can use this information to infer whether an item is present in the receptacle when the autonomous delivery vehicle 100 approaches to prevent or reduce overloading of the receptacle by deliveries from the autonomous delivery vehicle 100.

The vehicle arm connection configuration 304 can be related to a sorter arm related to a truck or other autonomous delivery vehicle 100. The vehicle arm connection configuration 304 can open back of the item receptacle to access a computer readable code on a sticker on the inside of the front door. The vehicle arm connection configuration 304 can provide unique identification.

FIGS. 14A and 14B depict a delivery chute 316. The delivery chute 316 can be used for aerial delivery. The delivery chute 316 can be use with the aerial autonomous delivery vehicle 100. The delivery chute 316 can be used with ground-based delivery. The delivery chute 316 can be use with any autonomous delivery vehicle 100 delivering from above the delivery chute 316. The delivery chute 316 can allow the autonomous delivery vehicle 100 to drop the item into the autonomous delivery drop point.

The delivery chute 316 can include one or more features to enhance security. The delivery chute 316 can include a door 318. The door 318 can be automated. The door 318 can provide protection for deliveries and items stored within the delivery chute 316. The door 318 can provide protection from adverse, unauthorized access. The door 318 can provide protection from thieves. The door 318 can provide protection from wildlife. The door 318 can provide protection from inclement weather. The door 318 can require a power connection in order for the door 318 to be automated. The door 318 can be triggered by a signal from the autonomous delivery vehicle 100. The delivery chute 316 can open the door 318 to receive the item. In some embodiments, the door 318 is hinged.

The delivery chute 316 can include some innate item braking. The delivery chute 316 can include sloped chute walls 320. The chute walls 320 can taper inward from the door toward the ground. For mail or non-fragile items, the delivery chute 316 can be a simple, low-tech delivery system and method. The delivery chute 316 can funnel deliveries toward an access door 322. The access door 322 can allow the owner or occupant to access the items within the delivery chute 316.

The delivery chute 316 can include the necessary support system for the weight of the items. The delivery chute 316 can include a support post 324. The owner could provide support system. The owner could decorate the support post 324 or other support system. The delivery chute 316 may come without the support post 324. The carrier, such as the USPS, could provide guidelines for the support post or other support system such as height and location.

The delivery chute 316 can include a platform 326. For airborne or aerial delivery by the autonomous delivery vehicle 100, the platform 326 can provide a weather-proofed deposit method. The delivery chute 316 can include a high tolerance, strengthened, sturdy material suitable for receipt of items that may be heavy, bulky, sharp, and the like. The platform 326 can provide a landing spot for low-battery level or damaged autonomous delivery vehicle 100, where the autonomous delivery vehicle 100 could be charged. The platform 326 can send a signal to the distribution network that a damaged or low battery autonomous delivery vehicle 100 is on the platform 326, to request assistance.

Figure 15:
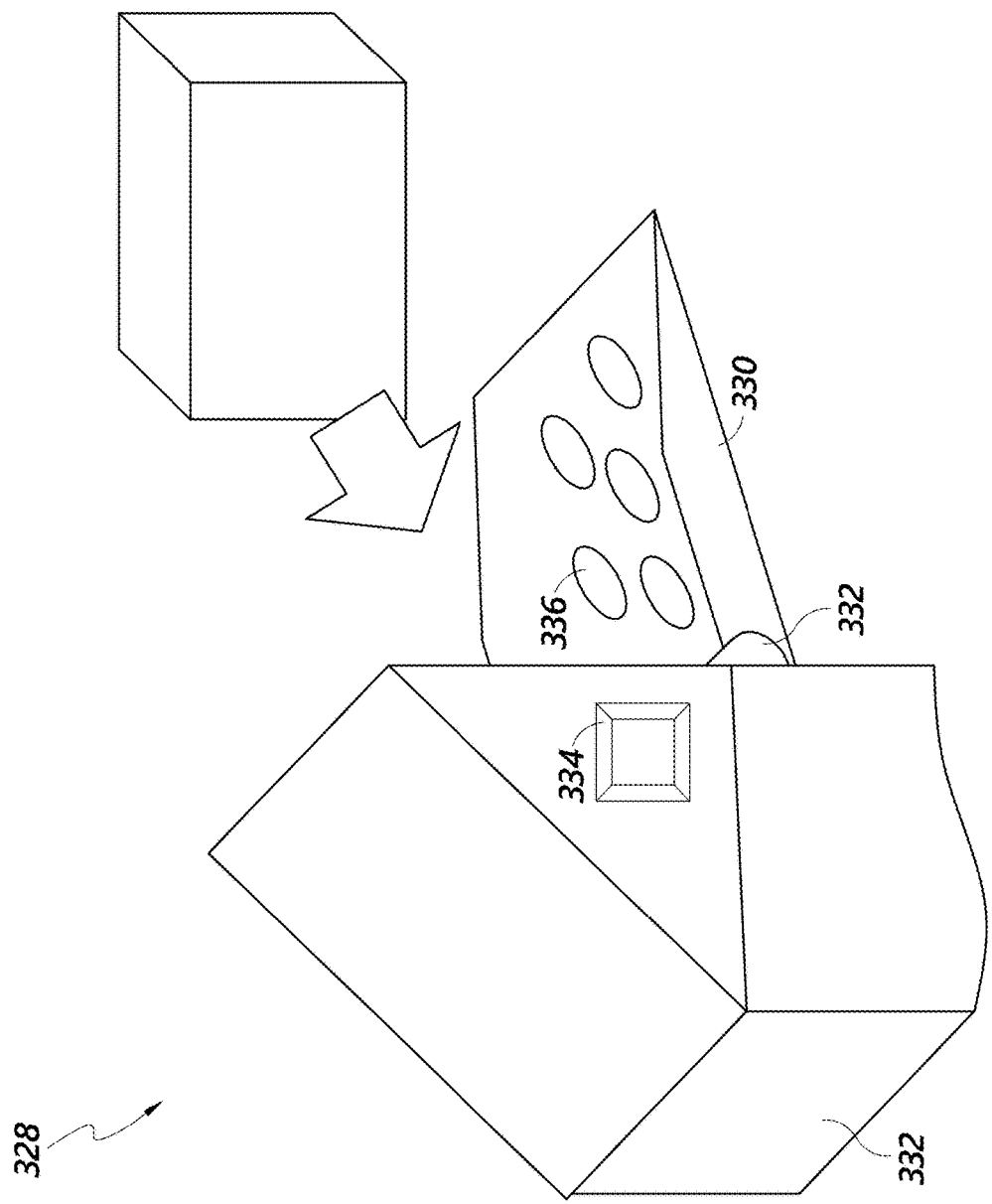
FIG. 15 depicts a perspective view of an embodiment of a scoop drop box.

FIG. 15 depicts a scoop drop box 328. The scoop drop box 328 can receive delivery from any autonomous delivery vehicle 100. The scoop drop box 328 can allow the autonomous delivery vehicle 100 to drop the item into the scoop drop box 328. The scoop drop box 328 can be similar in design to current self-service item drop-offs or other item drop-offs, such as USPS mail drop boxes. The scoop drop box 328 can operate in a similar manner to the self-service item drop-offs.

The scoop drop box 328 can include one or more features to enhance security. The scoop drop box 328 can include a door 330. The door 330 can be automated. The door can be hinged with hinge 332. The door 330 can provide protection for deliveries and items stored within the scoop drop box 328. The door 330 can provide protection from adverse, unauthorized access. The door 330 can provide protection from thieves. The door 330 can provide protection from wildlife. The door 330 can provide protection from inclement weather. The door 330 can require a power connection in order for the door 330 to be automated. The door 330 can be triggered by a signal from the autonomous delivery vehicle 100. The scoop drop box 328 can open the door 330 to receive the item. The door 330 can be hinged. The door 330 can be triggered by a signal from the autonomous delivery vehicle 100 to automatically lower the door 330.

As the door 330 is closed, the item can slide within the scoop drop box 328. The door 330 can function as a ramp. The item can slide along the door 330. As the door 330 is closed, the door 330 can taper inward toward the ground.

The item could proceed through a chute (not shown) to a receptacle 332. The chute could be a mechanically lowered chute. The door 330 can facilitate the receipt of delivery. The scoop drop box 328 can include suitable receptacle 332 for the one or more items.

The scoop drop box 328 can include a central identification chip 334. The central identification chip 334 can be weather protected such as through a protective casing. The central identification chip 334 can be affixed to the exterior of a target such as the scoop drop box 328, a storage receptacle or autonomous delivery drop point. The central identification chip 334 can provide information to the autonomous delivery vehicle 100. The information can include information in a propriety format. Examples include one or more dimensions of the storage receptacle, one or more dimensions of the autonomous delivery drop point, location, and residence information such as owner identification or owner name. The central identification chip 334 can be designed to connect with other features such as a lock, alarm, and sensor including proxy sensor and pressure sensor. The central identification chip 334 can be designed to provide security.

The scoop drop box 328 can include one or more features to reduce the accumulation of debris within the scoop drop box 328. The door 330 can be perforated. The perforations 336 can comprise small holes to allow debris such as rainwater or other liquid, leaves, acorns, trash or other particulate to empty from the scoop drop box 328. The door 330 could be perforated in order to minimize the transfer of elements into the scoop drop box 328 while deliveries are made. The perforations 336 could be small enough to prevent unintended intake or tampering with the scoop drop box 328. The perforation 336 could be randomized in placement to prevent the movement of water into the scoop drop box 328. The perforations 336 could be flush with the door 330 to prevent items from catching or being stuck within the perforations 336.

FIGS. 16-19 illustrate embodiments of item lowering systems. Some autonomous delivery drop point or other infrastructure described herein can require lowering of an item from the height of delivery. The item lowering system can lower the item to an accessible height for the recipient. The item lowering system can be used with aerial deliveries from the autonomous delivery vehicle 100. The item lowering system can ensure that fragile items are not damaged. Several different devices can be used as item lowering systems. Several different methods can be used to lower one or more items.

Figure 16:
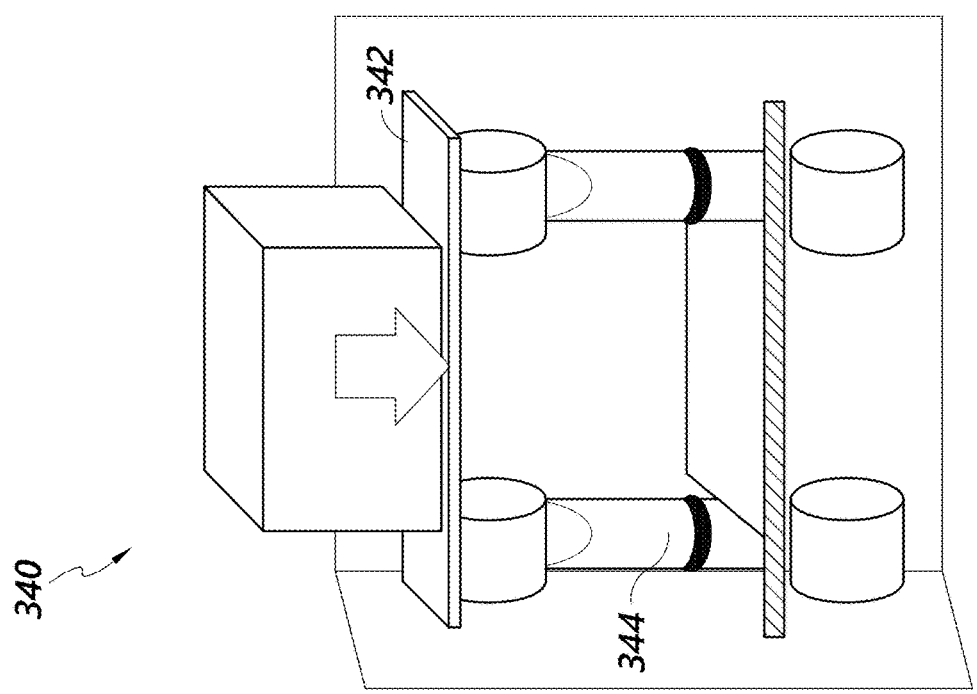
FIG. 16 depicts a perspective view of an embodiment of a weighted pneumatic arm.

FIG. 16 depicts a pneumatic item lowering system 340. The pneumatic item lowering system 340 can use the weight of the item to lower the item. The pneumatic item lowering system 340 can lower under the force of gravity. The autonomous delivery drop point or other infrastructure can require a method to safely lower items. The items can weigh up to a maximum weight. In some embodiments, the maximum weight is ten pounds, twenty pounds, thirty pounds, forty pound, fifty pounds, sixty pounds, seventy pounds, eighty pounds, ninety pounds, or one hundred pounds. Other configurations are contemplated. The items can be lowered to an accessible height. The items can be lowered into the autonomous delivery drop point. The items can be lowered into a storage receptacle. The items can be lowered through a door or port. The pneumatic item lowering system 340 can be used if the drop-off point from the autonomous delivery vehicle 100 is initially too high.

The pneumatic item lowering system 340 can include a platform 342 for the item. The pneumatic item lowering system 340 can include the proxy sensor, such as an active or passive proxy sensor. The proxy sensor can be located on the platform 342. The pneumatic item lowering system 340 can be a logical place to place a customer notification sensor to provide an indication that the item has arrived. The customer notification sensor can provide a ping or other signal when the item has arrived. The pneumatic item lowering system 340 can include a sensor that can detect whether the autonomous delivery drop point is full. The pneumatic item lowering system 340 can prevent delivery of additional items if the autonomous delivery drop point is full.

The pneumatic item lowering system 340 can include one or more components to lower the items. The pneumatic item lowering system 340 can include neutrally weighted pneumatic arms 344. The pneumatic item lowering system 340 can include screw or spring tensioned jacks. The pneumatic item lowering system 340 can include counterweighted elevators. The pneumatic item lowering system 340 can include a pseudo Archimedes screw.

Figure 17:
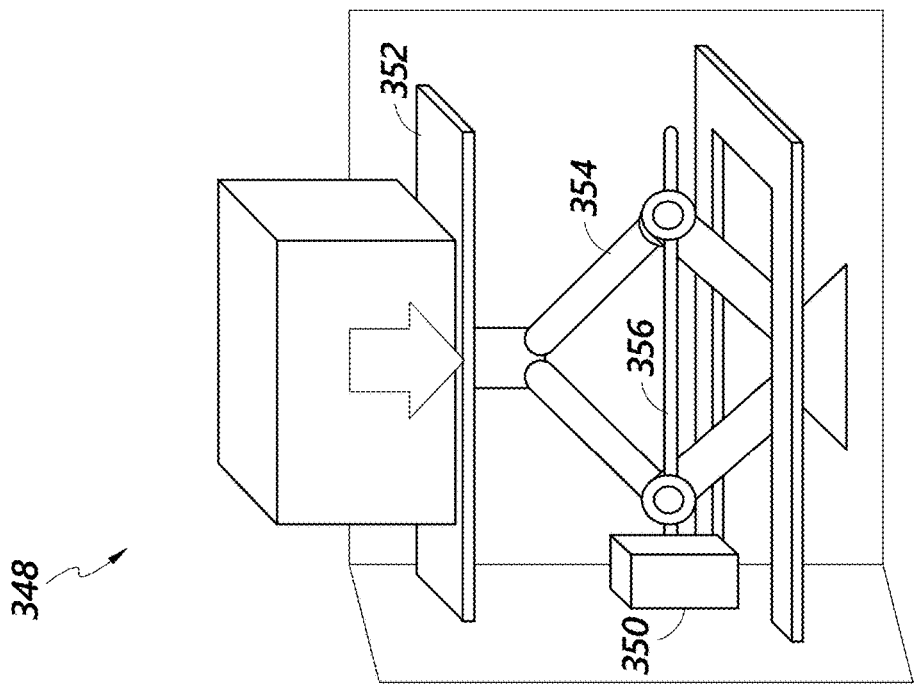
FIG. 17 depicts a perspective view of an embodiment of a scissor jack.

FIG. 17 depicts a scissor jack item lowering system 348. The scissor jack item lowering system 348 can include a mechanical scissor jack. The scissor jack item lowering system 348 can include a motor coupled to the mechanical scissor jack. The scissor jack item lowering system 348 can be raised or lowered. The autonomous delivery drop point or other infrastructure can require a method to safely lower items. The items can weigh up to a maximum weight. The items can be lowered into the autonomous delivery drop point. The items can be lowered into a storage receptacle. The items can be lowered through a door or port. The scissor jack item lowering system 348 can be used if the drop-off point from the autonomous delivery vehicle 100 is initially too high.

The scissor jack item lowering system 348 can require energy among the smallest energy amounts of various lifting mechanisms. The scissor jack item lowering system 348 can include very few parts for maintenance. The motor 350 can require an energy source, such as a 12 V energy source. The scissor jack item lowering system 348 can require less energy that the 12 V energy source. The scissor jack item lowering system 348 can include a platform 352. The scissor jack item lowering system 348 can include the scissor jack 354. The scissor jack 354 can include one or more intersecting arms or linkages. The scissor jack 354 can include a four bar linkage. The motor 350 can be coupled to a lead screw 356. The lead screw 356 can cause the expansion or collapse of the linkages. The scissor jack item lowering system 348 can be raised or lowered by rotating the lead screw in opposite directions.

Figure 18:
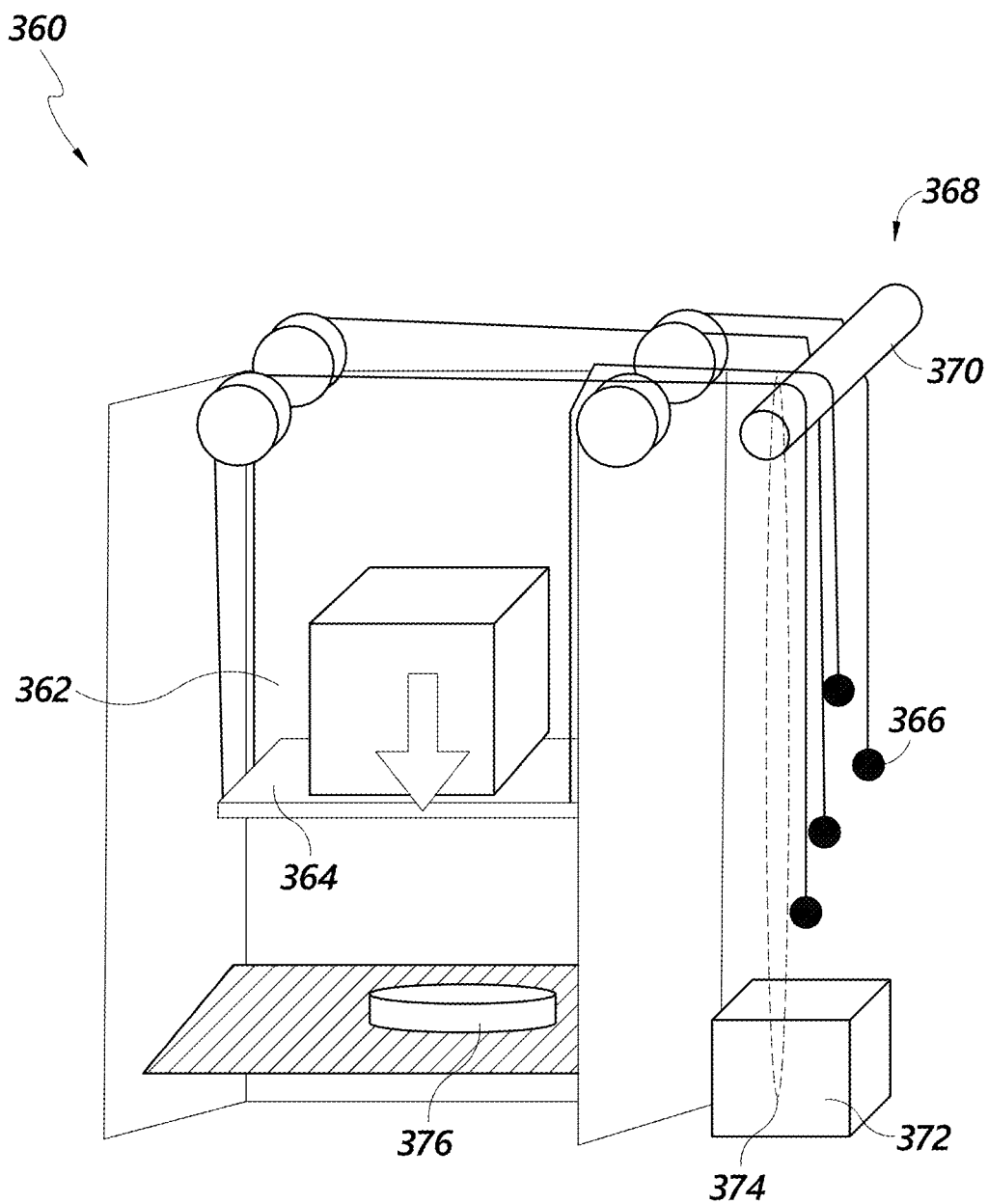
FIG. 18 depicts a perspective view of an embodiment of a pulley lowering system.

FIG. 18 depicts a pulley item lowering system 360. The pulley item lowering system 360 can include one or more pulleys. The pulley item lowering system 360 can be raised or lowered. The autonomous delivery drop point or other infrastructure can require a method to safely lower items. The items can weigh up to a maximum weight. The items can be lowered into the autonomous delivery drop point. The items can be lowered into a storage receptacle. The items can be lowered through a door or port. The pulley item lowering system 360 can be used if the drop-off point from the autonomous delivery vehicle 100 is initially too high.

The pulley item lowering system 360 can operate as an elevator. The pulley item lowering system 360 can be open from the top to receive items. The pulley item lowering system 360 can received items from the autonomous delivery vehicle 100. The pulley item lowering system 360 can be different than other elevators that have lift mechanism directly above the carriage 362. The pulley item lowering system 360 can be open from the top and thus the lift mechanism is not directly above the carriage 362. The carriage 362 can include a platform 364. The items can be delivered to the platform 364.

The pulley item lowering system 360 can include one or more pulleys 366. The pulleys can be part of an axle pulley system 368. The axle pulley system 368 can be a complex set of pulleys and axles that can allow the carriage 362 to move up and down. FIG. 16 depicts an axle 370. The pulley item lowering system 360 can include a motor 372. The pulley item lowering system 360 can include a gear chain 374. The pulley item lowering system 360 can include a counterweight 376.

Figure 19:
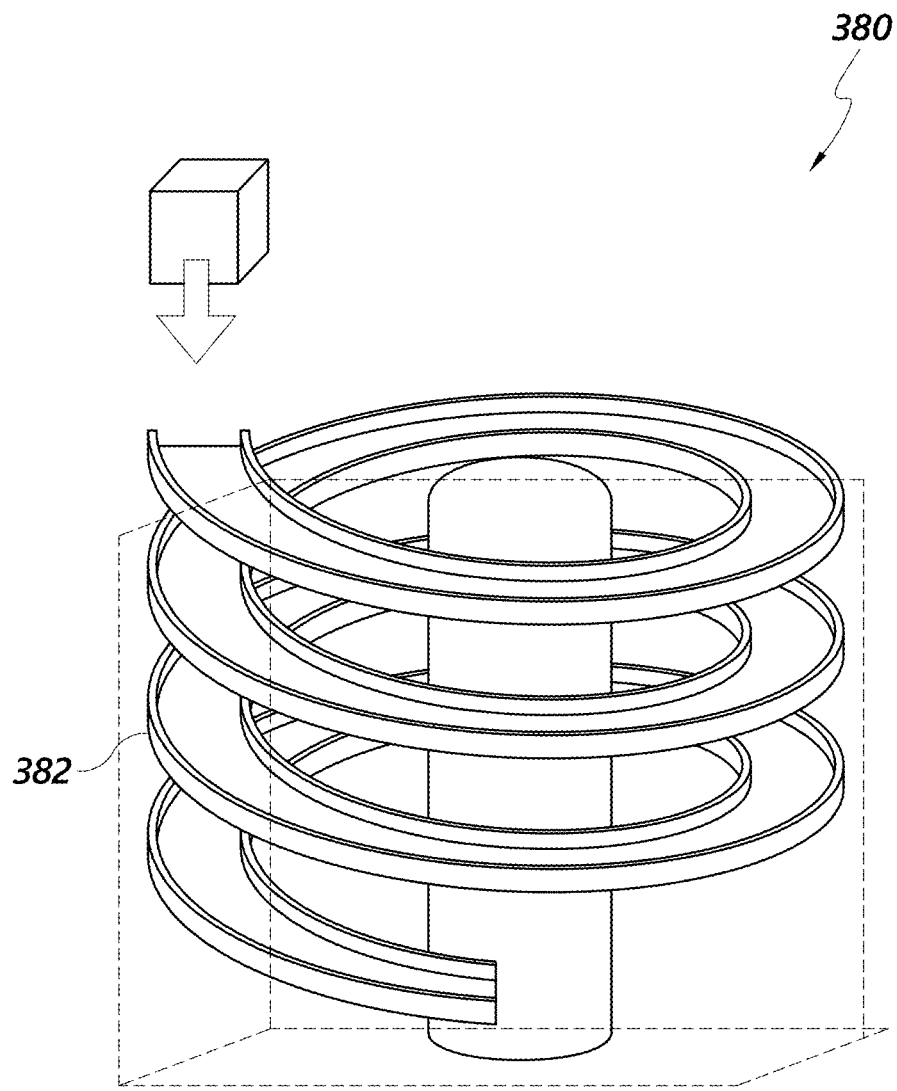
FIG. 19 depicts a perspective view of an embodiment of a screw shaped slide.

FIG. 19 depicts a screw slide lowering system 380. The screw slide lowering system 380 can lower items under the influence of gravity. The autonomous delivery drop point or other infrastructure can require a method to safely lower items. The items can weigh up to a maximum weight. The items can be lowered into the autonomous delivery drop point. The items can be lowered into a storage receptacle. The items can be lowered through a door or port. The screw slide lowering system 380 can be used if the drop-off point from the autonomous delivery vehicle 100 is initially too high.

The screw slide lowering system 380 can include a slide 382. The slide 382 can be in the shape of a screw or helix. The slide 382 can wind around the center of autonomous delivery drop point. The screw slide lowering system 380 can move an item from a certain height to a lower height. The screw slide lowering system 380 can include friction braking to slow the velocity of the item. The slide 382 can include friction braking. The braking for items can be accomplished through a textured surface of the slide 382. The braking can include a cushioned base. The screw slide lowering system 380 can minimize the powered components.

Figure 20:
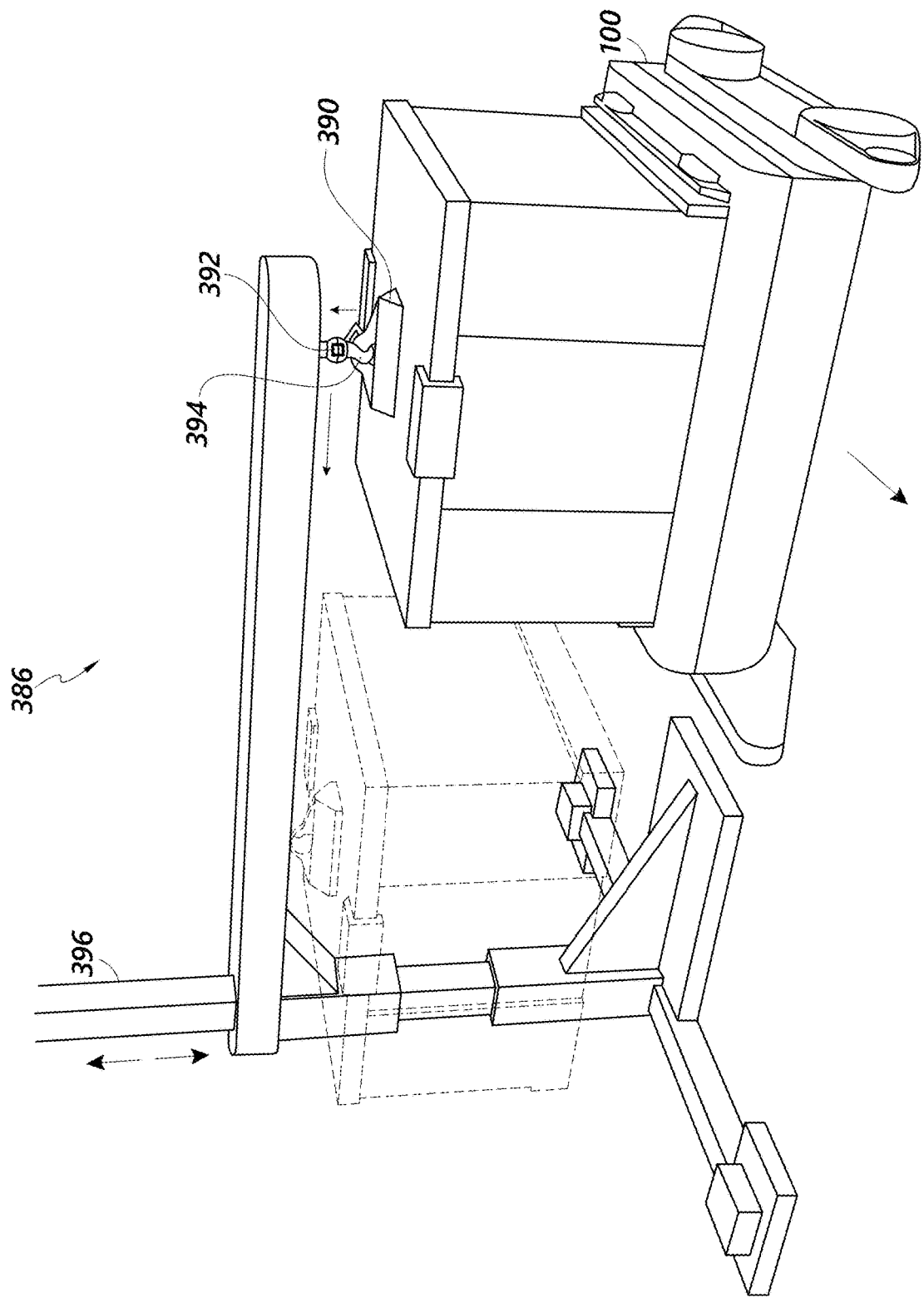
FIG. 20 depicts a perspective view of an embodiment of a delivery hook assembly.
Figure 21:
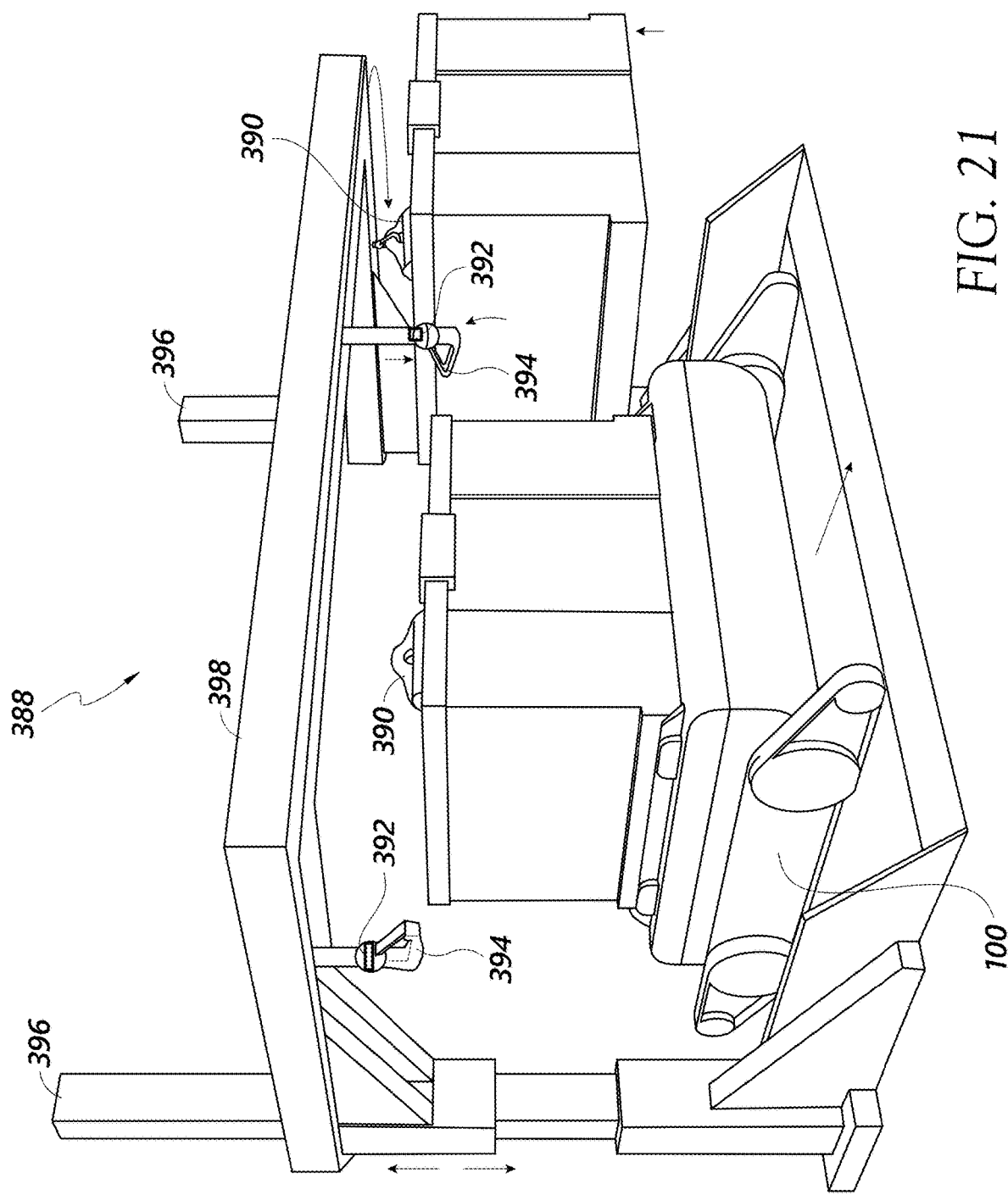
FIG. 21 depicts a perspective view of an embodiment of a storage hook assembly.

FIG. 20-21 illustrate hook systems. FIG. 20 depicts a perspective view of an embodiment of a hook assembly 386. FIG. 21 depicts a perspective view of an embodiment of a multi-hook assembly 388. The hook assembly 386 can accept deliveries via the autonomous delivery vehicle 100.

The hook assembly 386 can be used for a single family residence or a multi-family residence. The hook assembly 386 can be designed to accept one or more items at a time. The autonomous delivery vehicle 100 can deliver an item as described herein. The item can include an attachment member 390. The attachment member 390 can be a loop. The autonomous delivery vehicle 100 can drop off geospatial data from a proxy sensor 392. The proxy sensor 392 can be a passive proxy sensor. The proxy sensor 392 can be located within a hook 394. The proxy sensor 392 can provide the location of the hook 394. The proxy sensor 392 can provide position information to the autonomous delivery vehicle 100. The proxy sensor 392 can detect the availability of the hook 394 to accept an item. The hook 394 is configured to couple with the attachment member 390 to receive the item. Each item can be secured to a hook 394. The delivery hook assembly 386 can allow for the storage of each item individually.

The proxy sensor 392 can communicate with the autonomous delivery vehicle 100 where to drop the item. The proxy sensor 392 can communicate instructions including how to secure the item to the hook 394 of the delivery hook assembly 386 with the autonomous delivery vehicle 100. The autonomous delivery vehicle 100 can drop off the item on the hook 394. The hook 394 can be moved from a first location near the autonomous delivery vehicle 100. The hook 394 can be moved to a second location spaced from the autonomous delivery vehicle 100. The autonomous delivery vehicle 100 can continue on its way, for instance, along the route to another autonomous delivery drop point.

The hook assembly 386 can include structures to support the item. The hook assembly 386 can include a stake 396. The hook assembly 386 can be secured to the ground or other structure with the stake 396. The stake 396 can be a telescopic pole that can be adjustable. The stake 396 can be adjusted to accommodate different sized items. The stake 396 can be adjusted to accommodate different sized autonomous delivery vehicles 100. The stake 396 can allow for the delivery from several kinds of autonomous delivery vehicle 100, including aerial and ground based autonomous delivery vehicles. The delivery hook assembly 386 can allow for exception handling, for instance for items that should not be secured to the hook 394. The autonomous delivery vehicle 100 can delivery these items in another manner.

FIG. 21 depicts the multi-hook assembly 388. The multi-hook assembly 388 can include the features of the hook assembly 386. The item can include an attachment member 390. The attachment member 390 can be a loop. The autonomous delivery vehicle 100 can drop off geospatial data from a proxy sensor 392. The proxy sensor 392 can be a passive proxy sensor. The proxy sensor 392 can be located within a hook 394. The multi-hook assembly 388 can include two or more hooks 394. Each hook 394 can include a proxy sensor 392. The proxy sensor 392 can provide position information to the autonomous delivery vehicle 100. The multi-hook assembly 388 can allow for the storage of each item individually. The multi-hook assembly 388 can include the storage of multiple items. The multi-hook assembly 388 can store items simultaneously.

The multi-hook assembly 388 can include structures to support the two or more items. The hook multi-hook assembly 388 can include one or more stakes 396. The hook assembly 386 can be secured to the ground or other structure with the stake 396. The multi-hook assembly 388 can include a track 398. The two or more hooks 394 can be along the same track 398. The track 398 can connect two or more stakes 396.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The present disclosure refers to processor-implemented steps for processing information in the system. Instructions can be implemented in software, firmware or hardware and include any type of programmed step undertaken by components of the system.

The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 110 may comprise a processor 111 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-Series®, or FX® processor, or the like. The processor 111 typically has conventional address lines, conventional data lines, and one or more conventional control lines.

The system may be used in connection with various operating systems such as Linux®, UNIX®, MacOS®, or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Memory Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. An autonomous delivery receptacle comprising:
   a proxy sensor disposed on the autonomous delivery receptacle comprising a plurality of storage receptacles, the proxy sensor configured to:
      communicate information related to the autonomous delivery receptacle to an autonomous delivery vehicle;
      receive a recipient identifier from the autonomous delivery vehicle;
      identify a storage receptacle of the plurality of storage receptacles corresponding to the received recipient identifier; and
      instruct the autonomous delivery vehicle to deposit an item for delivery into the identified receptacle;
   a delivery inlet configured to accept the item; and
   a storage receptacle configured to store the item; and
   an access port to allow access to the item within the storage receptacle.

2. The autonomous delivery receptacle of claim 1, wherein the delivery inlet is an aerial port.

3. The autonomous delivery receptacle of claim 1, further comprising one or more arms configured to accept the item.

4. The autonomous delivery receptacle of claim 1, wherein the item is delivered via an autonomous delivery vehicle.

5. The autonomous delivery receptacle of claim 1, wherein each of the plurality of storage receptacles has a unique identifier thereon.

6. The autonomous delivery receptacle of claim 5, wherein each of the plurality of storage receptacles is assigned to a different recipient, and wherein the unique identifier on each of the plurality of storage receptacles is associated with the recipient assigned thereto.

7. The autonomous delivery receptacle of claim 1, wherein the proxy sensor is configured to interact with an autonomous delivery vehicle, and wherein the delivery inlet is configured to be opened upon completing a virtual handshake with the proxy sensor and the autonomous vehicle.

8. The autonomous delivery receptacle of claim 1, wherein the proxy sensor identifies the autonomous delivery receptacle as associated with a multi-unit dwelling.

9. The autonomous delivery receptacle of claim 1, wherein the delivery inlet is automatically operable.

10. The autonomous delivery receptacle of claim 9, wherein the delivery inlet is configured to automatically open in response to a virtual handshake between the autonomous delivery receptacle and an autonomous delivery vehicle.

* * * * *